United States Patent
Seeman et al.

(10) Patent No.: US 12,217,099 B1
(45) Date of Patent: Feb. 4, 2025

(54) RESOURCE ALLOCATION OPTIMIZATION USING ARTIFICIAL INTELLIGENCE

(71) Applicant: Source Technologies, Inc, Castle Rock, CO (US)

(72) Inventors: Joshua R. Seeman, Castle Rock, CO (US); Daniel G. Fox-Gliessman, Highlands Ranch, CO (US)

(73) Assignee: Source Technologies, Inc, Castle Rock, CO (US)

( * ) Notice: Subject to any disclaimer, the term of this patent is extended or adjusted under 35 U.S.C. 154(b) by 0 days.

(21) Appl. No.: 18/749,419

(22) Filed: Jun. 20, 2024

Related U.S. Application Data

(60) Provisional application No. 63/509,272, filed on Jun. 20, 2023, provisional application No. 63/509,279, filed on Jun. 20, 2023.

(51) Int. Cl.
*G06F 9/50* (2006.01)
*G06N 3/08* (2023.01)
*G06Q 10/0631* (2023.01)

(52) U.S. Cl.
CPC .......... *G06F 9/5077* (2013.01); *G06F 9/5038* (2013.01); *G06N 3/08* (2013.01); *G06Q 10/0631* (2013.01)

(58) Field of Classification Search
CPC ....... G06F 9/5077; G06F 9/5038; G06N 3/08; G06Q 10/0631; G06Q 10/063
See application file for complete search history.

(56) References Cited

U.S. PATENT DOCUMENTS

| | | | |
|---|---|---|---|
| 7,373,325 B1 | 5/2008 | Hadingham et al. | |
| 2007/0112671 A1 | 5/2007 | Rowan | |
| 2010/0312683 A1 | 12/2010 | Yeung | |
| 2021/0117504 A1* | 4/2021 | Kumar | G06F 40/174 |
| 2021/0216719 A1* | 7/2021 | Mahindru | G06F 40/295 |
| 2021/0241366 A1 | 8/2021 | Aldhaheri et al. | |
| 2021/0304134 A1* | 9/2021 | Noyes | G06N 20/00 |
| 2021/0304271 A1* | 9/2021 | Norwood | G06Q 10/0875 |
| 2021/0304272 A1* | 9/2021 | Posey | G06Q 30/0635 |
| 2021/0304273 A1* | 9/2021 | Norwood | G06Q 30/0641 |
| 2022/0067618 A1* | 3/2022 | Goli | G06F 40/211 |

(Continued)

FOREIGN PATENT DOCUMENTS

| | | |
|---|---|---|
| KR | 20060040044 A | 5/2006 |
| WO | 2004042515 A2 | 5/2004 |

*Primary Examiner* — Kenneth Tang
(74) *Attorney, Agent, or Firm* — MUGHAL GAUDRY & FRANKLIN PC

(57) ABSTRACT

A computer-implemented method for optimizing resource allocation using machine learning algorithms. The method receives input data from various sources, including project requirements, timelines, and project allocation, and analyze using machine-learning algorithms to prediction which entities are most suitable for given projects. The method generates a prioritized list of qualified entities and offers strategic recommendations for resource distribution. The machine-learning algorithm manages ongoing transactions, monitors compliance, and predicts future resource needs, comparing these predictions against project allocation thresholds. If predicted needs exceed the project allocation, the system issues warnings. An interface allows users to adjust resource strategies and monitor project progress through visual analytics dashboards.

20 Claims, 16 Drawing Sheets

(56) References Cited

U.S. PATENT DOCUMENTS

2023/0316197 A1\* 10/2023 Jemiri .................... G06Q 10/06
                                                                705/7.36
2024/0257036 A1\*  8/2024 Bobrova ............... H04L 67/306

\* cited by examiner

RESOURCE ALLOCATION OPTIMIZATION USING ARTIFICIAL INTELLIGENCE

PRIORITY

This application claims the benefit of and priority to U.S. Provisional Application Nos. 63/509,272 and 63/509,279, both filed Jun. 20, 2023, the contents of which are incorporated herein by reference in their entireties.

BACKGROUND

This disclosure relates in general to resource allocation optimization that is a critical process for companies seeking to win digital records or procure goods and services from suppliers. Traditional resource allocation optimization processes often involve time-consuming manual tasks, such as reviewing RFPs/RFIs, identifying qualified resource distribution entities, and orchestrating resource distribution strategy submissions. In addition, resource allocation optimization often relies on biased information, subjective assessments, and can be hindered by incomplete or inaccurate data. This disclosure relates in general to resource distribution that is a critical process for companies seeking to win digital records or procure goods and services from suppliers. Traditional resource distribution processes often involve time-consuming manual tasks, such as reviewing RFPs/RFIs, identifying qualified entities, and orchestrating resource distribution strategy submissions. In addition, resource distribution often relies on biased information, subjective assessments, and can be hindered by incomplete or inaccurate data.

Moreover, existing resource allocation optimization systems are limited in their ability to leverage the vast amounts of data available in today's interconnected digital world. Further, traditional resource allocation optimization systems often lack the ability to generate insights and recommendations to help network nodes identify qualified resource distribution entities and optimize their resource distribution strategies. This can result in missed opportunities for both Entities and network nodes and can lead to suboptimal outcomes for all parties involved. Therefore, there is a need for a resource allocation optimization system that leverages artificial intelligence and machine learning to ingest and process large amounts of data, generate intelligent insights and recommendations, and improve the accuracy and efficiency of resource allocation optimization processes. Moreover, existing resource distribution systems are limited in their ability to leverage the vast amounts of data available in today's interconnected digital world. Further, traditional resource distribution systems often lack the ability to generate insights and recommendations to help network nodes identify qualified entities and optimize their resource distribution strategies. This can result in missed opportunities for both Entities and network nodes and can lead to suboptimal outcomes for all parties involved. Therefore, there is a need for a resource distribution system that leverages artificial intelligence and machine learning to ingest and process large amounts of data, generate intelligent insights and recommendations, and improve the accuracy and efficiency of resource distribution processes.

SUMMARY

In one embodiment, the present disclosure provides one or more techniques that aims to eliminate the drawbacks of the traditional resource allocation optimization system by introducing a new smart resource allocation optimization system. This system is adapted to analyze the large amount of data (for example, social connections between resource distribution entities and network nodes in the resource distribution strategy selection process, quality scores, minority certifications, trade code, location, and historical data about resource distribution entities) and lead to optimal resource distribution strategy decisions and predicting the optimal Entity/resource distribution strategy for any project based on the RFI/RFP.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment, the present disclosure provides techniques for optimizing resource allocation using machine-learning predictive algorithms. This system analyzes large amounts of data, including project requirements, timelines, project allocations (referred as budget allocated to projects), relational data, performance metrics, and past records to generate Structured data. Further, predictive algorithms are applied to this Structured data to prediction which entities are most suitable for projects. In addition, the system generates a prioritized list of qualified entities and offers strategic recommendations for resource distribution. It manages ongoing transactions, monitors compliance, predicts future resource needs, and issues warnings if predicted needs exceed predefined project allocation thresholds. An interface allows users to adjust resource strategies and monitor project progress through visual analytics dashboards.

One general aspect includes a computer-implemented method for resource allocation optimization using artificial intelligence. The computer-implemented method also includes receiving project data related to one or more requests for proposal (RFP) or requests for information (RFI). The method also includes ingesting and processing the project data, including RFP/RFI criteria, social connections, quality scores, historical data, and other parameters, to generate structured data. The method also includes analyzing the structured data using one or more machine learning models to generate predictions about which resource distribution entities are likely to win or qualify for the projects.

The method also includes generating a list of qualified resource distribution entities based on the predictions. The method also includes transmitting the list of qualified resource distribution entities, along with recommendations for resource distribution strategy values, to the RFP/RFI initiator (network node). The method also includes generating association data between a user and a provider based on the analysis of account data, where the association data is used in the analysis of the structured data to generate the predictions. The method also includes generating a list of qualified entities based on the predictions.

Implementations may include one or more of the following features. The method may include: assigning a score to the amount of data available for analysis, where if the score is less than a certain threshold, the system proceeds to gather data from social media platforms where the user and provider are registered; and generating an interface for the user to confirm the link between them and the provider, where if the user confirms the link, the system executes a machine learning algorithm based on the link information.

The method may include: receiving the project allocation from the user and determining ongoing digital records with providers; and determining providers with which the digital record has been finalized and receiving the present resource allocation, including how much digital transaction has been made and new RFPs for which the digital record has to be signed. The method may include: receiving the project allocation from the user and determining ongoing transactions (agreements) with service entities; and determining service entities with which the digital record has been finalized and receiving the present resource distribution, including how much digital transaction has been made and new RFPs for which the digital record has to be signed.

The method may include: predicting the future allocation based on the present resource allocation and compliance data of providers, digital record event markers (milestones); issuing a warning if the predicted future allocation surpasses the project allocation; and presenting an interface to ask if the project allocation can be increased, and if the project allocation cannot be increased, presenting an interface to receive input for recommending how to avoid project allocation overrun.

The method may include: determining new RFPs for which the digital record has to be signed and recommending providers that are under project allocation; providing the user with a list of recommended providers and the amount of project allocation that will be allocated to each provider; and enabling the user to select the provider based on their preference.

The method may include determining the performance index of the technical services required for the project based on parameters extracted from the RFP/RFI, and assigning a score to the performance index for each of the providers.

The method may include analyzing historical data and profile information of the providers to collect feedback data on provider performance. The method may include evaluating the quality of the feedback data and comparing it to a threshold value. The method may include refining the selection of providers using a machine learning model based on their past performance and generating a list of providers for the project.

Implementations of the described techniques may include hardware, a method or process, or computer software on a computer-accessible medium. The method also includes generating a list of qualified resource distribution entities based on the predictions. The method also includes transmitting the list of qualified resource distribution entities, along with recommendations for resource distribution strategy values, to the RFP/RFI initiator (network node). The method also includes orchestrating ongoing digital records with providers based on the present resource allocation, compliance data of providers, digital record event markers, etc., to predict future allocation, recommend providers that are under project allocation, and allocate the project allocation based on the recommendations. Other embodiments of this aspect include corresponding computer systems, apparatus, and computer programs recorded on one or more computer storage devices, each configured to perform the actions of the methods.

The method also includes generating a list of qualified entities based on the predictions. The method also includes transmitting the list of qualified entities, along with recommendations for resource distribution strategy values, to the RFP/RFI initiator (network node). The method also includes orchestrating ongoing transactions with service entities based on the present resource distribution, adherence information of service entities, transaction benchmarks, etc., to predict prospective distribution, recommend service entities that are cost-efficient, and distribute resources based on the recommendations.

Other embodiments of this aspect include corresponding computer systems, apparatus, and computer programs recorded on one or more computer storage devices, each configured to perform the actions of the methods. The method also includes generating a list of qualified resource distribution entities based on the predictions. The method also includes transmitting the list of qualified resource distribution entities, along with recommendations for resource distribution strategy values, to the RFP/RFI initiator (also referred as network node). Other embodiments of this aspect include corresponding computer systems, apparatus, and computer programs recorded on one or more computer storage devices, each configured to perform the actions of the methods. The method also includes generating a list of qualified entities based on the predictions. The method also includes transmitting the list of qualified entities, along with recommendations for resource distribution strategy values, to the network node. Other embodiments of this aspect include corresponding computer systems, apparatus, and computer programs recorded on one or more computer storage devices, each configured to perform the actions of the methods.

One general aspect includes a computer-implemented resource allocation optimization system. The computer-implemented resource allocation optimization system also includes a registration module for registering users and extracting contact data and social media information. One general aspect includes a computer-implemented resource distribution system. The computer-implemented resource distribution system also includes a registration module for registering users and extracting contact data and social media information.

The system also includes a processor configured to receive project data related to one or more requests for proposal (RFP) or requests for information (RFI), ingest and process the project data, analyze the structured data using one or more machine learning models to generate predictions about which resource distribution entities are likely to win or qualify for the projects, and generate a list of qualified resource distribution entities based on the predictions. The system also includes a processor configured to receive input information related to one or more requests for proposal (RFP) or requests for information (RFI), ingest and process the input information, analyze the Structured data using one or more predictive algorithms to generate predictions about which entities are likely to win or qualify for the projects, and generate a list of qualified entities based on the predictions.

The system also includes a resource distribution strategy recommendation module configured to provide recommendations for resource distribution strategy values. The system also includes a transmission module configured to transmit the list of qualified resource distribution entities and recommendations for resource distribution strategy values to the network node. Other embodiments of this aspect include corresponding computer systems, apparatus, and computer programs recorded on one or more computer storage devices, each configured to perform the actions of the methods. The system also includes a resource distribution strategy recommendation module configured to provide recommendations for resource distribution strategy values. The system also includes a transmission module configured to transmit the list of qualified entities and recommendations for resource distribution strategy values to the network node. Other embodiments of this aspect include corresponding computer systems, apparatus, and computer programs recorded on one or more computer storage devices, each configured to perform the actions of the methods.

Implementations may include one or more of the following features. The resource allocation optimization system where the registration module further may include: an authentication module configured to authenticate the user's contact data using one or more data providers, and determine the user's ratings based on their past performance on the platform, the ratings being compared with a first threshold value to determine if the authentication request is rejected or accepted; and a scoring module configured to assign a score based on the authenticity of the user's contact data, the score being compared with a third threshold value to determine if the authentication request is rejected or accepted. Implementations may include one or more of the following features. The resource distribution system where the registration module further may include: an authentication module configured to authenticate the user's contact data using one or more data service entities, and determine the user's ratings based on their past performance on the platform, the ratings being compared with a first threshold value to determine if the authentication request is rejected or accepted; and a scoring module configured to assign a score based on the authenticity of the user's contact data, the score being compared with a third threshold value to determine if the authentication request is rejected or accepted.

The registration module further may include a duration module configured to determine the duration of the user's association with the platform, the duration being compared with a second threshold value to determine if the authentication request is rejected or accepted. The registration module further may include a social media platform determination module configured to determine all of the social media platforms on which the user is registered, and a social media rating module configured to determine the ratings of each social media platform to assess their reliability and trustworthiness. The registration module further may include a duration module configured to determine the duration of the user's association with the platform, the duration being compared with a second threshold value to determine if the authentication request is rejected or accepted. The registration module further may include a social media platform determination module configured to determine all of the social media platforms on which the user is registered, and a social media rating module configured to determine the ratings of each social media platform to assess their reliability and trustworthiness.

The registration module further may include a social media authentication module configured to receive authentication data from third-party data providers associated with each social media platform, the authentication data including information on the number of spam messages the user has received, the number of connections they have, and the degree of activeness on the platform. The registration module further may include a social media authentication module configured to receive authentication data from third-party data service entities associated with each social media platform, the authentication data including information on the number of spam messages the user has received, the number of connections they have, and the degree of activeness on the platform.

Implementations of the described techniques may include hardware, a method or process, or computer software on a computer-accessible medium.

One general aspect includes a computer-implemented method for resource allocation optimization using artificial intelligence. The computer-implemented method also includes receiving project data related to one or more requests for proposal (RFP) or requests for information (RFI). One general aspect includes a computer-implemented method for resource distribution using artificial intelligence. The computer-implemented method also includes receiving input information related to one or more requests for proposal (RFP) or requests for information (RFI).

The method also includes ingesting and processing the project data, including RFP/RFI criteria, social connections, quality scores, historical data, and other parameters, to generate structured data. The method also includes analyzing the structured data using one or more machine learning models to generate predictions about which resource distribution entities are likely to win or qualify for the projects. The method also includes collecting and analyzing the input information, including RFP/RFI criteria, relational data, performance metrics, past records, and other factors, to generate Structured data. The method also includes analyzing the Structured data using one or more predictive algorithms to generate predictions about which entities are likely to win or qualify for the projects.

The method also includes generating a list of qualified resource distribution entities based on the predictions. The method also includes transmitting the list of qualified resource distribution entities, along with recommendations for resource distribution strategy values, to the network node, where the method further may include: The method also includes generating a list of qualified entities based on the predictions. The method also includes transmitting the list of qualified entities, along with recommendations for resource distribution strategy values, to the network node, where the method further may include:

The method also includes determining the required technical service for the project based on extracted parameters and past digital record analysis. The method also includes assessing the quality of the service provided by assigning a performance index based on the determined technical service and analyzing feedback data from providers. The method also includes determining the required technical service for the project based on extracted factors and past digital record analysis. The method also includes assessing the quality of the service provided by assigning a performance index based on the determined technical service and analyzing feedback data from service entities.

The method also includes quantifying the feedback data to facilitate comparison with a threshold value. The method also includes analyzing social graph data if the quantified value is less than the threshold value. The method also includes assigning a second score and selecting a provider if the quantified value is greater than the threshold value and the difference between the first score and the second score is higher than the second threshold value. The method also includes quantifying the feedback data to facilitate comparison with a threshold value. The method also includes analyzing social graph data if the quantified value is less than the threshold value. The method also includes assigning a second score and selecting a provider if the quantified value is greater than the threshold value and the difference between the first score and the second score is higher than the second threshold value.

The method also includes determining the execution time of the project based on project parameters and ongoing digital record analysis. The method also includes selecting providers based on performance index, ongoing digital record analysis, and machine learning model refinement. The method also includes determining the execution time of the project based on project factors and ongoing digital record analysis. The method also includes selecting service entities based on performance index, ongoing digital record analysis, and machine learning model refinement.

The method also includes generating recommendations for resource distribution strategy values for the selected providers. Other embodiments of this aspect include corresponding computer systems, apparatus, and computer programs recorded on one or more computer storage devices, each configured to perform the actions of the methods. The method also includes generating recommendations for resource distribution strategy values for the selected service entities. Other embodiments of this aspect include corresponding computer systems, apparatus, and computer programs recorded on one or more computer storage devices, each configured to perform the actions of the methods.

Implementations may include one or more of the following features. The method where the determination of the required technical service further may include analyzing additional parameters such as project allocation, timeline, and location. The feedback data is quantified using a performance score ranging from 1 to 10. Implementations may include one or more of the following features. The method where the determination of the required technical service further may include analyzing additional factors such as project allocation, timeline, and location. The feedback data is quantified using a performance score ranging from 1 to 10.

The ongoing digital record analysis for determining slot availability includes analyzing the ongoing digital records of providers to determine their availability for the project. Implementations of the described techniques may include hardware, a method or process, or computer software on a computer-accessible medium. The ongoing digital record analysis for determining slot availability includes analyzing the ongoing transactions of service entities to determine their availability for the project. Implementations of the described techniques may include hardware, a method or process, or computer software on a computer-accessible medium.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label with a second alphabetical label that distinguishes among the similar components. If only the first reference label is used in the specification, the description applies to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
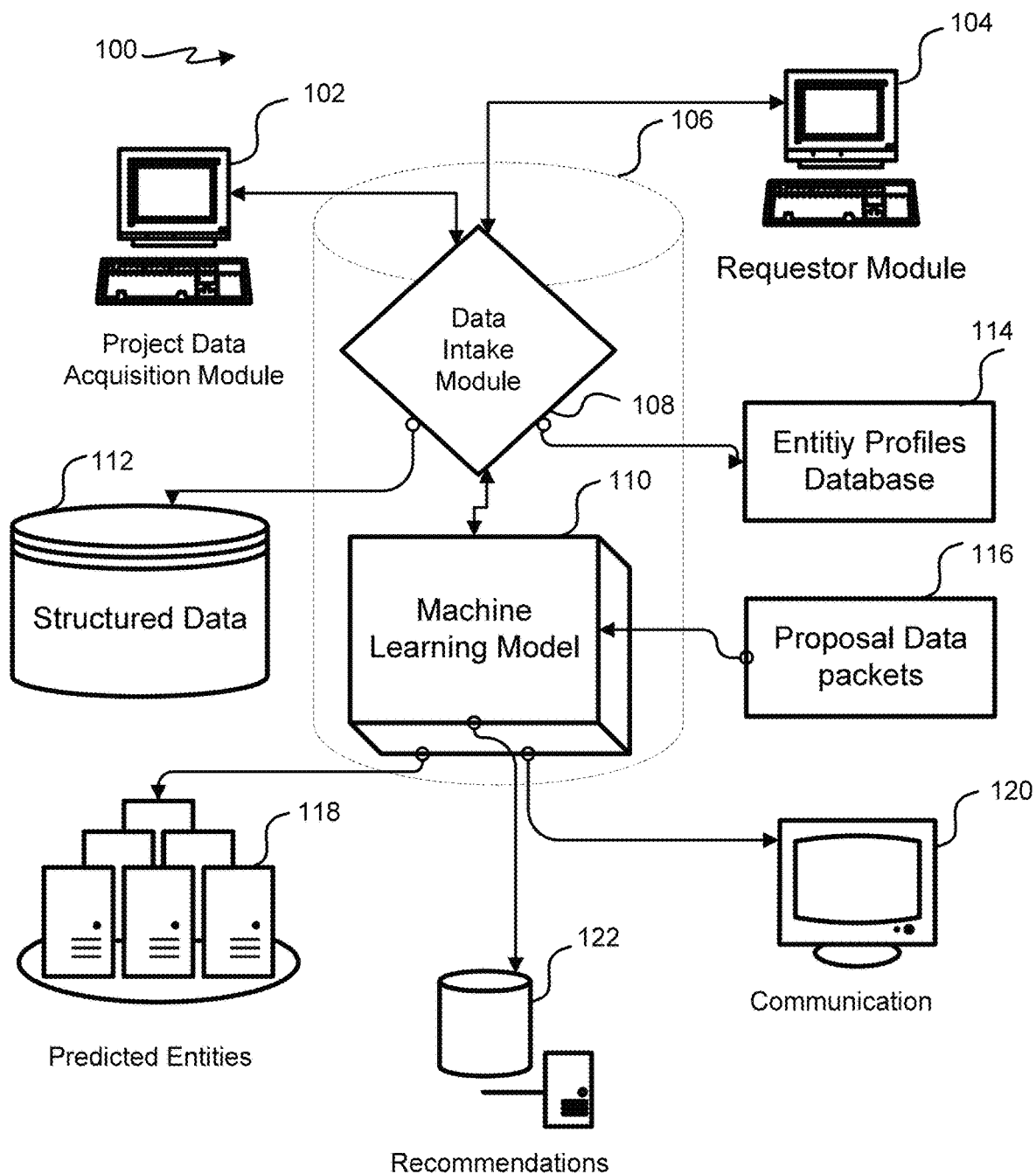
FIG. 1 illustrates an architecture of the resource management system according to an embodiment of the present disclosure.

Referring to FIG. 1 illustrates the architecture of the resource management system 100, designed for optimizing resource management using artificial intelligence (AI). The system is comprised of several interconnected modules, all coordinated through the Machine Learning Module 110, and is configured to handle project data acquisition, data processing, prediction generation, and communication with users.

The Project Data Acquisition Module 102 is responsible for receiving project data related to one or more Requests for Proposal (RFP) or Requests for Information (RFI). This data includes RFP/RFI criteria, social connections, quality scores, historical data, and other relevant parameters necessary for the resource management process. The Requestor Module 104 interfaces with users to gather specific requirements and preferences related to the resource management process, serving as a bridge between the user and the system to ensure accurate capture and processing of user needs.

At the core of the system is the processor 106, which coordinates the operations of its sub-modules: the Data Intake Module 108 and the Machine Learning Module 110. The Data Intake Module 108 ingests and processes the project data received from the Project Data Acquisition Module 102, and transforms this organized data into structured data 112. This structured data format allows for efficient analysis by subsequent modules.

The Machine Learning Module 110 is adapted to analyze the Structured Data 112 using one or more machine learning models and generates predictions about which Network nodes are likely to qualify for the projects (also referred as predicted entities 118). To make these predictions, the module utilizes comprehensive Entity Data Profiles 114, which are generated based on historical data, social connections, and other relevant parameters. Additionally, Proposal Data Packets 116 contain detailed information about each resource, including resource amounts and project requirements, and are used to evaluate and compare different resources. Based on the analysis, the system generates a list of Qualified Network nodes and Resource Recommendations 122, which are then transmitted to the RFP/RFI initiator. If the predicted future allocation surpasses a predefined project allocation threshold, a Communication Warning Message 120 is issued, prompting the user to adjust the resource distribution strategy to avoid project allocation (referred as budget allocated to projects) overruns.

The system also includes a Digital records Management Module for managing ongoing digital records with Network nodes, utilizing present resource allocation and compliance data to predict future allocations. The Resource Allocation Unit further aids in distributing resources based on these predictions and recommendations. To ensure continuous improvement, the Feedback Data Analyzer and Performance Index Calculator analyze feedback data, helping refine the system's predictions and recommendations.

In one exemplary embodiment, the system assigns a score to the amount of data available for analysis. In case the score is below a threshold, additional data is gathered from social media platforms, and an interface is generated for the user to confirm the link between them and the provider. If confirmed, the system executes a machine learning algorithm based on the link. In another embodiment, the system manages ongoing digital records, predicting future allocations and issuing warnings if necessary. Users can then adjust their strategy through an interface. Another embodiment involves determining the performance index of technical services required for the project, assigning scores to the performance index for each Network node, and analyzing historical data and profile information to collect feedback data on provider performance.

Figure 2:
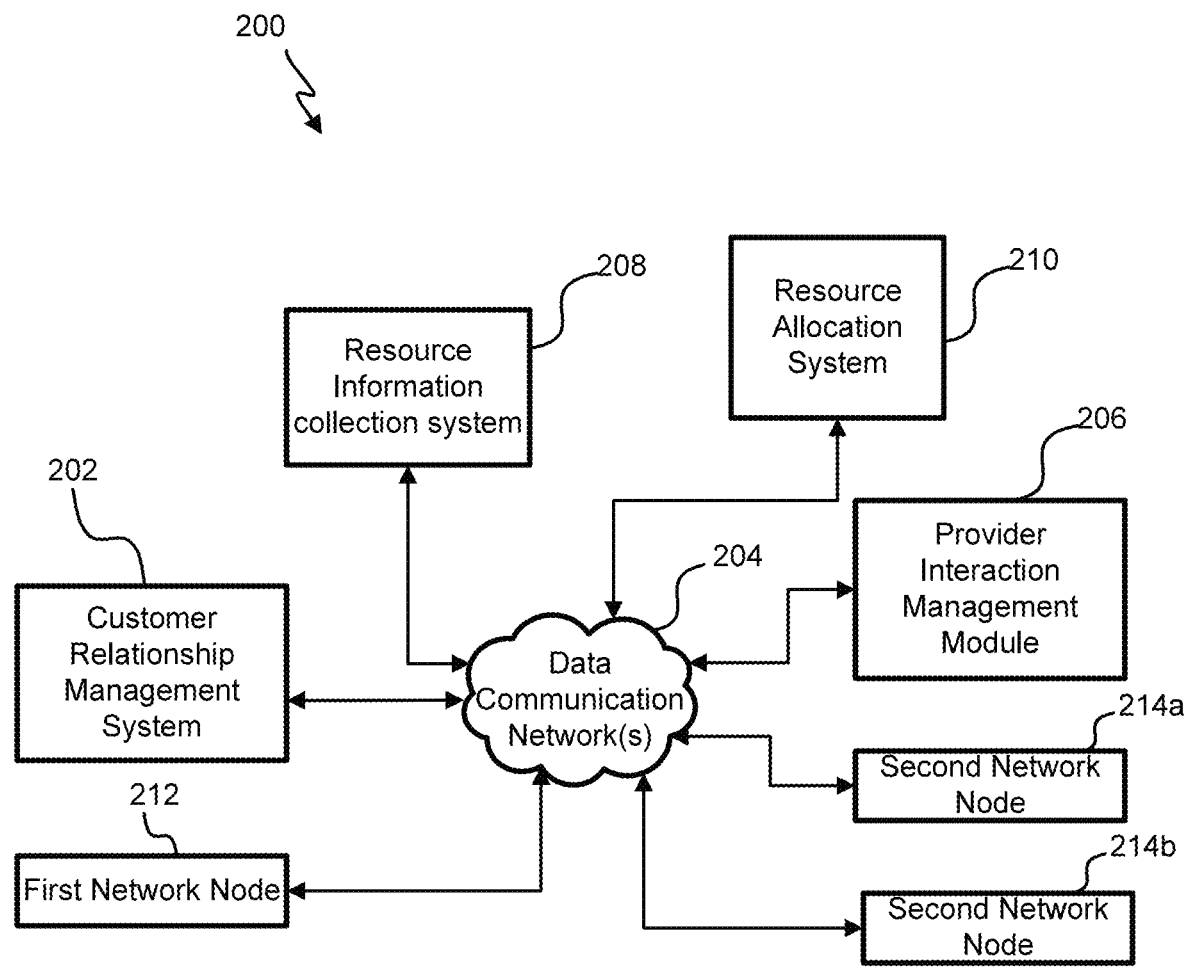
FIG. 2 illustrates block diagram of the resource management system according to an embodiment of the present disclosure.

These embodiments highlight the resource management system 100's ability to ingest, process, analyze, and predict data, ensuring accurate and efficient management of resources. Referring to FIG. 2, illustrates a block diagram of a resource management system 100. As described in further detail herein, FIG. 2 illustrates a block diagram of a resource management system for connecting Entities and network nodes over a data communication network. The system consists of several key elements, including a customer relationship management (CRM) system 202, a supplier relationship management (SRM) system 106, a resource information collection system 208, a resource management system 210, a plurality of Entity terminals 212, and a plurality of provider terminals 214a and 214b.

In one exemplary embodiment, the CRM system 202 is configured for managing customer interactions and data. The CRM system 202 acts as a central database that receives, over a cloud platform, and processes information related to customer inquiries, purchases, and other interactions. The customer information and data remains secure using encryption techniques and not being stored on any physical devices. This information is then used by the resource management system 210 to make informed resource management decisions and recommendations. In one exemplary embodiment, the resource management system 210 can be integrated with the CRM system 202 to generate data driven recommendations for the users. Further, in one other exemplary embodiment, the resource management system 210 can be adapted to generate recommendations without being integrated into any CRM system 202.

In addition, the SRM system 206 is adapted to manage the relationships between the network nodes and the Entities. The SRM system 206 serves as a database for provider information, such as their contact details, products, and pricing. The SRM system 206 is responsible for collecting and organizing resource information from the providers over the data communication network 204. The providers can use the provider terminal s 214a and 214b to submit their resources.

As described in further detail below, in some instances, the resource information collection system 208 serves as an interface between the SRM system 206 and the resource management system 210. The resource information collection system 208 collects the resource information from the providers and sends it to the resource management system 210 for processing. Further, the resource management system 210 is the central element of the resource management system. It receives resource information from the resource information collection system 208 and uses it to generate insights and recommendations. It may use algorithms and machine learning techniques to analyze the data and make informed resource management decisions. The resource management system 210 can send recommendations to the Entity terminals 212 for further consideration.

In one exemplary embodiment, the system could include additional modules for tracking provider performance, evaluating Entity demand, and managing pricing negotiations. The system could also incorporate blockchain technology for secure and transparent resource management. Additionally, the system could be adapted for use in various industries, such as manufacturing, healthcare, or retail.

In one another exemplary embodiment, the system 102 serves as a key tool for building and maintaining customer relationships. The SRM system 106 helps businesses connect with providers and negotiate favorable terms. The resource management system 110 provides valuable insights for making informed resource management decisions and optimizing supply chain operations.

In one another exemplary embodiment of the resource management system focusses on improving the user interface and user experience for Entities and network nodes, with features such as a dashboard for resource tracking, recommendations, and a messaging system for direct communication between Entities and network nodes.

In one another exemplary embodiment, the system provides improved efficiency and accuracy in the resource management process, increased transparency between Entities and network nodes, and the ability to generate insights and recommendations that can help Entities and network nodes make informed decisions.

In one another exemplary embodiment, the Entity terminal and/or provider terminal can be any type of computing device that is portable, e.g., smartphones, mobile phones, tablets, and/or other similar devices.

In one exemplary embodiment, the resource management system 210, powered by artificial intelligence and machine learning, serves as a key differentiator for the system, providing valuable insights for making informed resource allocation decisions. The database 208 acts as a central hub for storing and retrieving information, allowing for efficient communication and collaboration between technology Entities 202 and technology Network nodes/providers 204.

Figure 3:
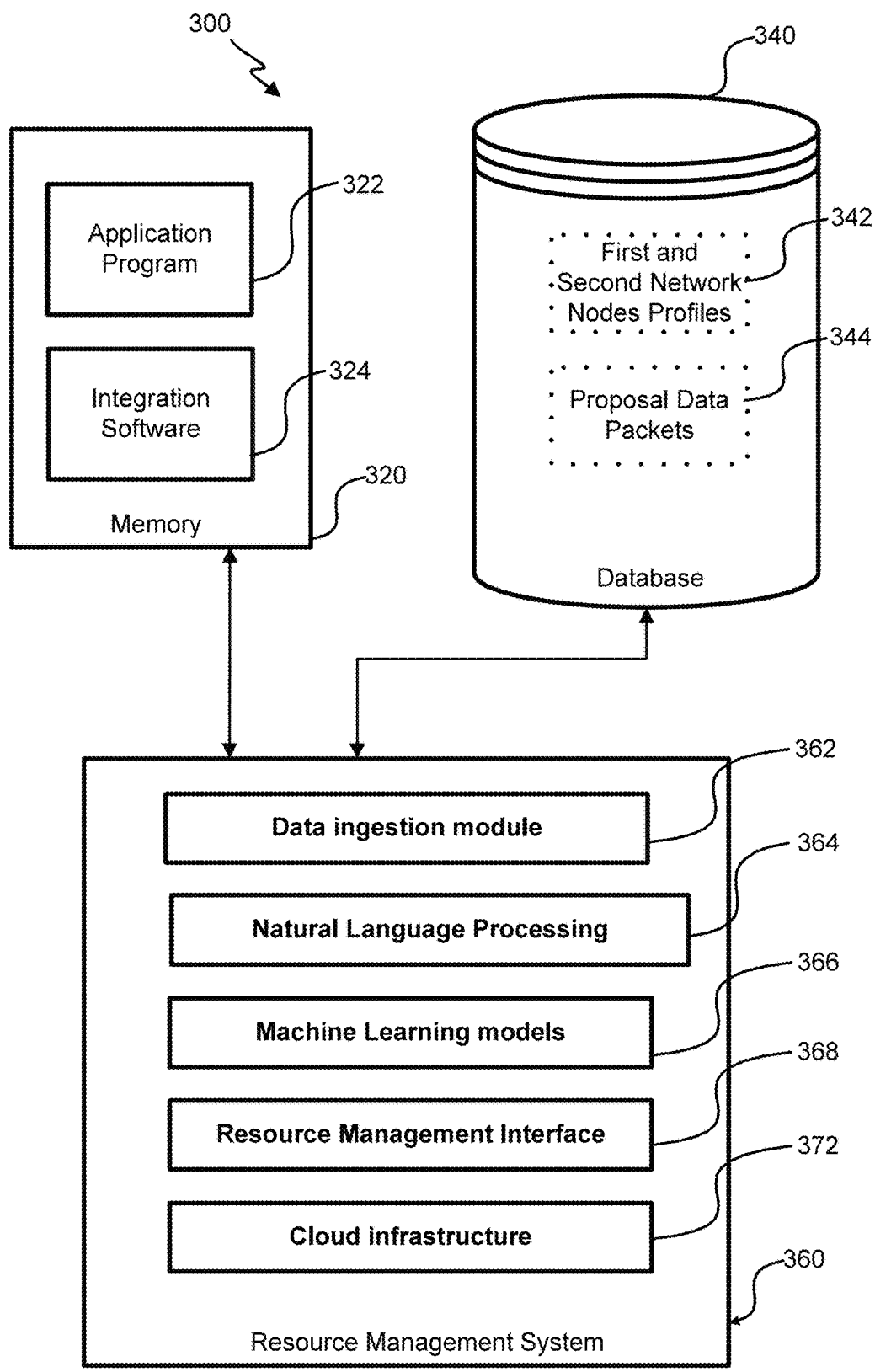
FIG. 3 illustrates a resource allocation optimization system using machine learning model according to an embodiment of the present disclosure.

Referring to FIG. 3, illustrates a resource management system using machine learning model. The patent drawings depict a machine learning model for a resource management system 300, which includes a storage unit 320, a central database 340, and a resource management system 360.

As described in further detail herein, the storage unit 320 is adapted to store an application program 322 and integration software 324. The application program 322 is a resource management application or software that enables technology Entities to submit resources for specific resources. The integration software 324 facilitates communication between the resource management system 360 and other software or systems, such as accounting or inventory management systems.

In one exemplary embodiment, the central database 340 includes Entity and/or network node profiles 342, which store information about technology Entities and technology Network nodes/providers, and Proposal data packet 344, which store information about resources submitted by technology Entities. The resource management system 360 includes a data ingestion module 362, which retrieves data from the central database 340 and other sources, a natural language processing (NLP) module 364, which uses machine learning algorithms to analyze and understand text-based data, a machine learning (ML) module 366, which applies machine learning algorithms to make informed resource recommendations, a resource management interface 368, which allows technology Entities to submit resources and view recommendations, and a cloud infrastructure 372, which facilitates secure and scalable data storage and processing.

In one another exemplary embodiment, the modules in the resource management system 360 are communicatively coupled with each other, allowing for seamless data sharing and processing. For example, the data ingestion module 362 may retrieve information about resources submitted by technology Entities from the central database 340 and feed that data into the NLP module 364. The NLP module 364 could then analyze the resources and extract relevant information, such as the resources requested, delivery timeline, and pricing. This information then fed into the ML module 366, which applies machine learning algorithms to make informed recommendations for resource acceptance or rejection. The resource management interface 368 allows technology Entities to view these recommendations and submit resources accordingly.

In one another exemplary embodiment, The storage unit 320 can be configured to write and/or read data from one or more data stores, such as application program 322 and/or integration software 324. Moreover, the storage unit 320 can include, for example, random access memory (RAM), dynamic random access memory (DRAM), read-only memory (ROM), flash-ROM, cache, storage chip, and/or removable memory. Storage unit 320 can include various types of application data for each of one or more applications loaded (e.g., downloaded or pre-installed) onto the end-user device.

Figure 4:
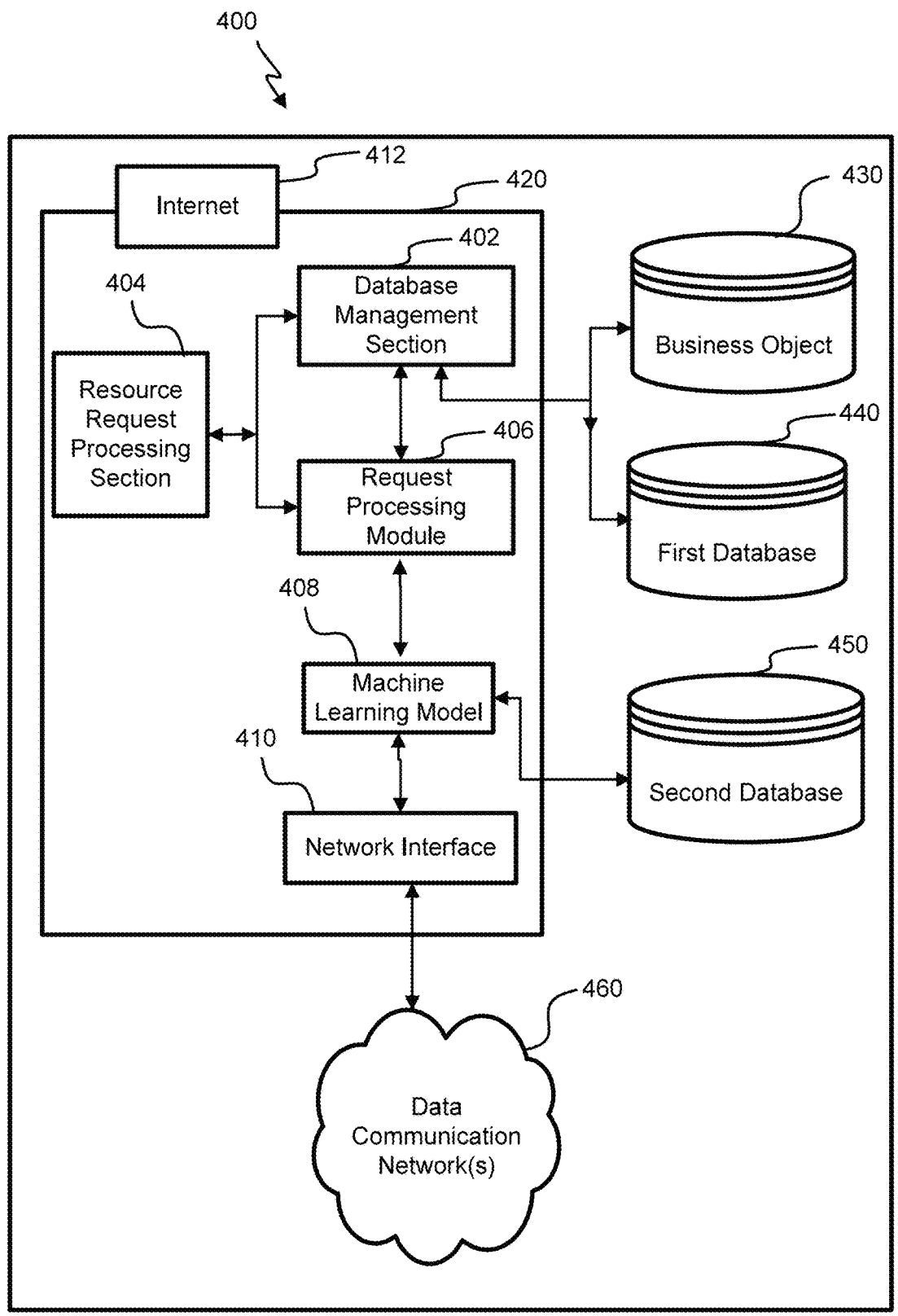
FIG. 4 illustrates a block diagram of machine learning model for resource allocation optimization system according to an embodiment of the present disclosure.

Referring to FIG. 4, illustrates a block diagram of machine learning model for resource management system. As described in further detail herein, the resource request processing system 400 is designed to efficiently process resource requests and RFI/RFP/request for offer (RFOs) in a timely manner. The resource request processing module 420 handles the incoming resource requests from various sources and passes them on to the appropriate processing section. The business object database 430 stores relevant business information for the processing sections to access. The RFO database 440 stores the RFI/RFP/RFO received by the system.

In one exemplary embodiment, the user management database 450 stores user account information, such as contact details and authentication credentials. The data communication network 460 facilitates communication between the different modules and databases in the system.

In one another exemplary embodiment, the database management section 402 is responsible for maintaining the databases in the system, including the business object database 430, the RFO database 440, and the user management database 450. Moreover, the resource request processing section 404 handles the processing of incoming resource requests, and uses machine learning module 408 to analyze the data and make recommendations to the users.

In one another exemplary embodiment, the RFO processing module 406 processes the RFOs/RFI/RFP received by the system, and uses the information stored in the business object database 430 to generate appropriate responses. The network interface 410 provides the interface for the user to interact with the system, and the internet connectivity module 412 ensures that the system is connected to the internet and can communicate with users.

The internet module 412 can be configured to generate and/or process radio signals with a frequency between 2.4 gigahertz and 5 gigahertz. The internet module 412 can include a wireless network interface card that includes circuitry to facilitate communicating using a particular standard (e.g., physical and/or link-layer standard).

Figure 5:
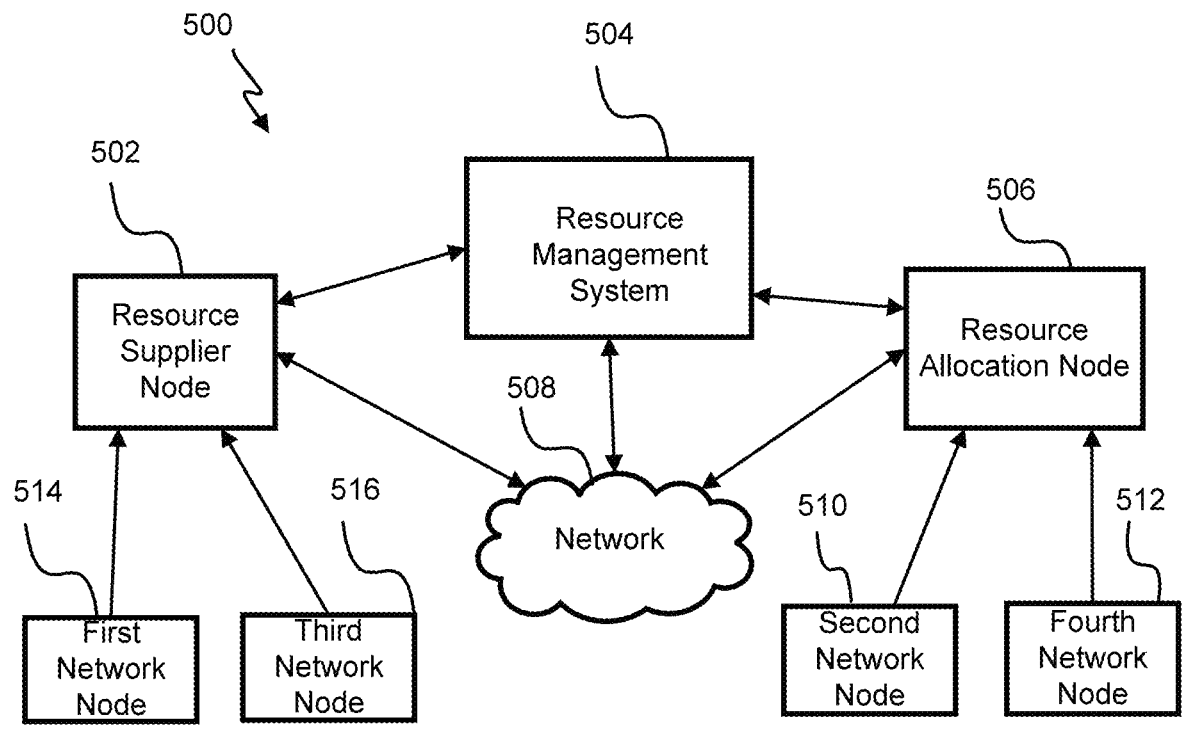
FIG. 5 illustrates a block diagram of resource management system according to an embodiment of the present disclosure.

Referring to FIG. 5, illustrates a block diagram of resource management system. As described in further detail herein, FIG. 5 illustrates a resource management system 500 that facilitates the interaction between technology Entities and Network nodes/providers over a network. The system 500 includes a technology provider interface 502 (SRM System), a technology Entity interface 506 (CRM System), a resource management system 504, and a network 508. The technology provider interface 502 comprises provider devices 514 and 516, and the technology Entity interface 506 comprises user devices 510 and 512.

In one exemplary embodiment, the resource management system 504 serves as an intermediary between the technology Entities and Network nodes/providers, allowing them to connect and exchange resources. The technology Network nodes/providers can register their devices with the system 504, which will be made available to the technology Entities for purchase or rental. In addition, the technology Entities can access the resource management system 504 to search for available resources and make requests.

In one another exemplary embodiment, the system 500 provides a seamless experience to both technology Entities and Network nodes/providers, allowing them to interact with each other in a user-friendly way. It also provides a centralized platform for managing resources, which can improve efficiency and reduce costs.

As yet another example, the system can also be used as a platform for discovering new business opportunities and expanding networks.

In one another exemplary embodiment, the environment shown in FIG. 5 is a resource management system 504 that communicates with a provider register 502 and a user register 506 via a network 508. The provider register 502 contains the account information of service Network nodes/providers, including their profile information, historical information, and social information.

Furthermore, the profile information consists of details such as their name, address, contact number, contact mail, services offered, and number of working staff. The historical information includes past digital records, feedback from users on those digital records, execution time, and whether the digital records was terminated or completed. The social information includes information on social media platforms where the Network nodes/providers are registered.

In one another exemplary embodiment, the user register 506 contains the account information of users, including their profile information, historical information, and social information. The profile information consists of details such as their name, address, contact number, contact mail, and the organization in which they work. The historical information includes past digital records, feedback from Network nodes/providers on those digital records, digital transaction details, and whether the digital records was terminated or completed. The social information includes information on social media platforms where the users are registered.

In one another exemplary embodiment, the provider register 502 and user register 506 are connected to the resource management system 504 via a network 508, which enables communication between the two registers and the system. Moreover, the resource management system 504 uses the information stored in the provider and user registers to match the requirements of users with the services offered by Network nodes/providers. The system can also analyze the historical information of Network nodes/providers and users to generate recommendations for users and Network nodes/providers.

As yet another example, this system could include the addition of more filters for users to refine their search for service Network nodes/providers. Furthermore, the system could also include a rating system for both Network nodes/providers and users to provide feedback on their experience. Additionally, the system could incorporate a chat function to enable communication between Network nodes/providers and users before a digital records is agreed upon. In one exemplary embodiment, the system can include a community feature where Network nodes and Entities can establish and/or form a group to exchange their reviews and recommendations. More particularly, to become a member of such community, both Network nodes and Entities have to fulfil a system generated eligibility criteria. The eligibility criteria corresponds to at least one or their social/current rating, skills level, and feedback received from previous customers but not limited to these parameters only.

As yet another example, the system utilizes the historical and social information of both Network nodes/providers and users to match requirements with services, making it easier and more efficient for users to find the right provider for their needs. In addition, the system also provides a feedback mechanism that allows Network nodes/providers and users to build trust and confidence in each other.

Figure 6:
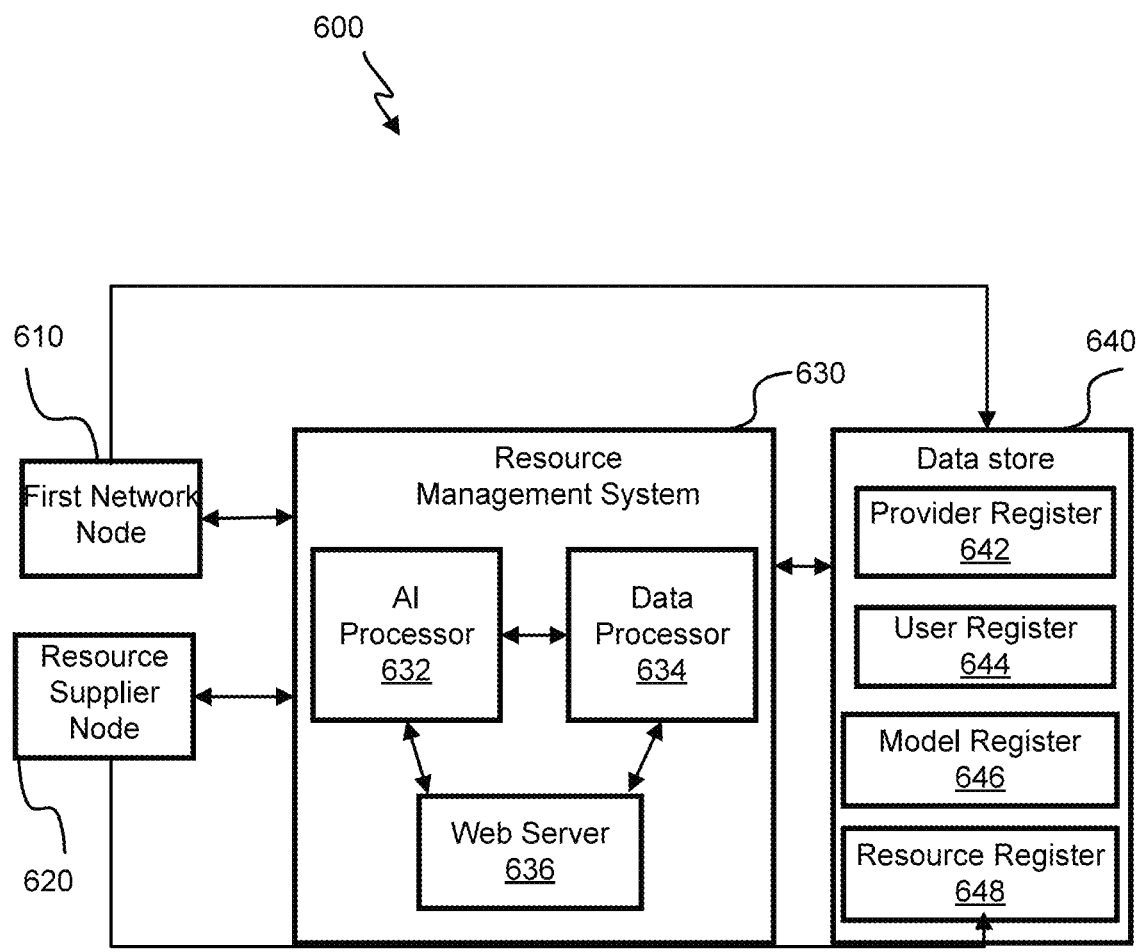
FIG. 6 illustrates a block diagram of machine learning model for resource management system according to an embodiment of the present disclosure.

Referring to FIG. 6, illustrates a block diagram of machine learning model for resource management system. In one exemplary embodiment, the system 600 includes four main elements: a Entity device 610, a technology provider device 620, a resource management system 630, and a data store 640. These elements are communicatively coupled with each other via a communication network or cloud technology.

As described in further detail herein, the resource management system 630 includes an AI processor 632, a data processor 634, and a web server 636, which are also communicatively coupled with each other and exchanging information. The data store 640 includes a provider register 642, a user register 644, a model register 646, and a resource register 648 for storing various types of data.

In one exemplary embodiment, the Entity device 610 and technology provider device 620 are used to initiate resources and provide resources respectively. The resource management system 630 processes these resources and matches them based on the available resources stored in the data store 640. The AI processor 632 uses machine learning algorithms to optimize the matching process and improve the accuracy of the resources. The data processor 634 is responsible for handling the storage and retrieval of data in the data store 640. The web server 636 provides a web interface for users to interact with the resource management system 630.

As yet another example, the system could be implemented with different types of communication networks such as cellular networks or satellite networks, and the data store 640 could be implemented with different types of databases such as SQL or NoSQL databases. Additionally, the system could also be designed to work with different types of devices, such as smartphones or tablets, as long as they can connect to the communication network.

In one exemplary embodiment, FIG. 6 illustrates communication and interaction between different components of the resource management system 600. The system 600 includes an AI processor 632, a data processor 634, and a web server 636. The system also interacts with a user device 610, a provider device 620, a data store 640, and various registers, including a provider register 642, a user register 644, a model register 646, and a resource register 648.

In one exemplary embodiment, the data processor 634 receives and processes data from various sources, including the user device, the provider device, and the different registers. It then transmits this processed data to the web server and the AI processor for further processing. The web server executes the functions of the resource management system and generates output data, which is sent back to the data processor and the AI processor for further processing.

As described in further detail herein, the AI processor executes machine learning algorithms on the processed data to generate output data, which is then transmitted back to the data processor and the web server for further processing and transmission to the user device, provider device, and registers.

Figure 7:
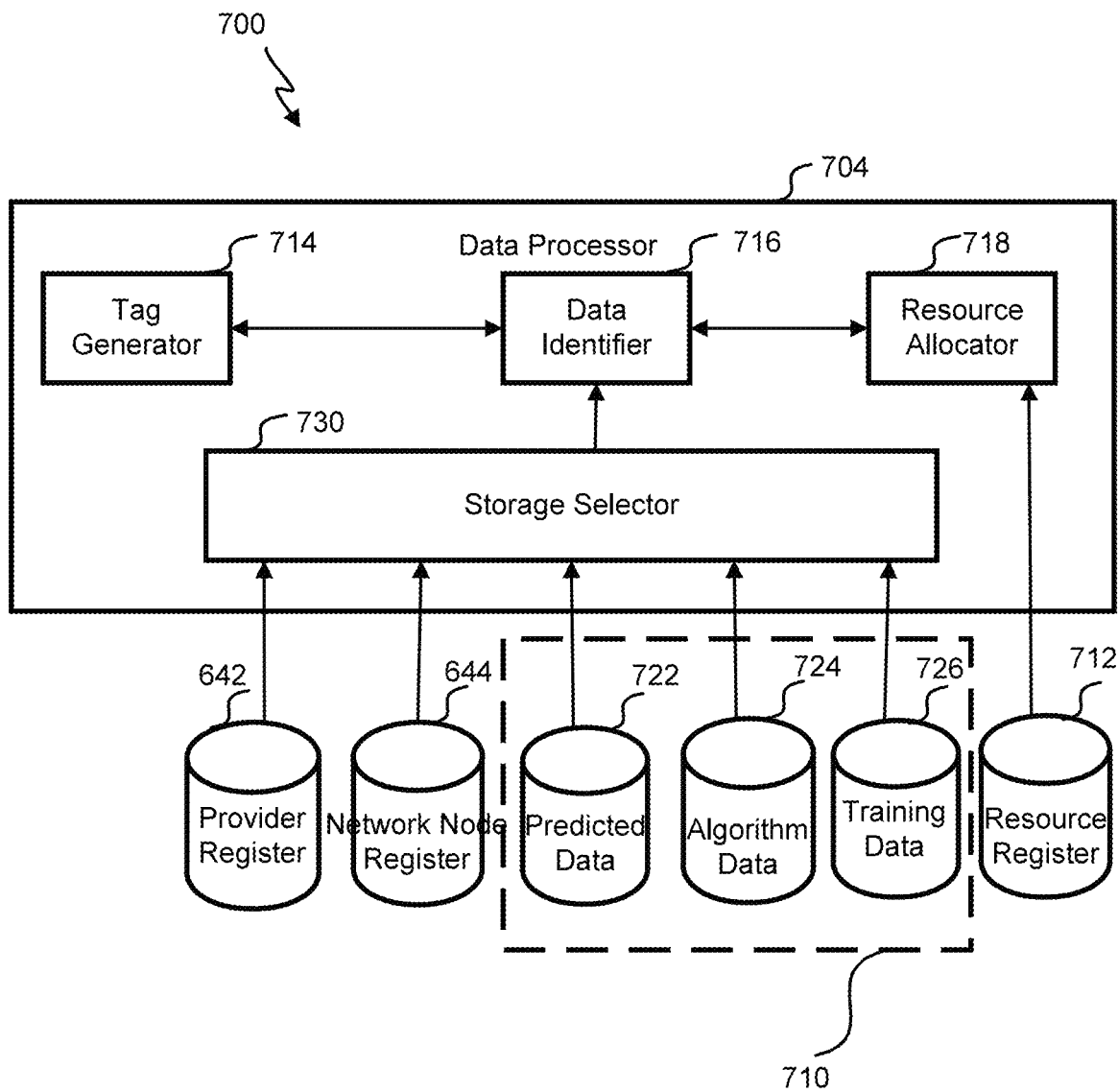
FIG. 7 illustrates a block diagram of resource allocator model for resource management system, according to an embodiment of the present disclosure.

Referring to FIG. 7, illustrates a block diagram of resource allocator model for resource management system. As described in further detail herein, FIG. 7 illustrates a resource allocator system that includes various modules and databases working together to allocate resources efficiently. In one exemplary embodiment, the system 700 includes a data processing module 704, which receives input data and generates tags for identification purposes using the tag generator 714. The data identifier 716 identifies the data and matches it with the appropriate resources in the resource register 712. The resource allocator 718 then allocates the resources based on the identified data and tags.

In one exemplary embodiment, the storage selector 730 selects the appropriate storage for the data and tags based on their size and type. Moreover, the provider register 642 and the Entity register 644 store information about the technology Network nodes/providers and Entities, respectively. In some instances, the ML prediction database 710 includes ML predicted data 722, algorithm data 724, and ML training data 726, which are used by the machine learning module to predict and optimize resource allocation.

In one another exemplary embodiment, the storage selector 730 selects a storage from the data store 640 according to an input received from the web server 636 or the AI processor 632. Once the storage is selected, the data identifier 716 identifies the characteristics of the data and determines the bits of a data stream generated by the tag generator 714. Further, the tag generator 714 makes the bits 0 or 1 in the data stream according to the presence or absence of characteristics in the selected data. For instance, if the selected data is related to historical digital records from the provider register, the tag generator 714 identifies that the data includes digital transaction information, a starting date, a completion date, and a feedback rating.

In one another exemplary embodiment, the resource allocator 718 then determines the resource allocation for the data in which digital transaction information is required. The resource allocator 718 works with the web server 636 to execute the functions of the resource management system. Additionally, the AI processor 632 may generate a selection signal to the storage selector 730 for training or executing the machine learning model.

As yet another example, the resource allocator 718 can help businesses optimize their resource allocation, while the tag generator 714 and data identifier 716 allow for more streamlined processing of large amounts of data. The AI processor 632 and web server 636 offer functionality for machine learning and data analysis, providing businesses with valuable insights and competitive advantages.

Figure 8:
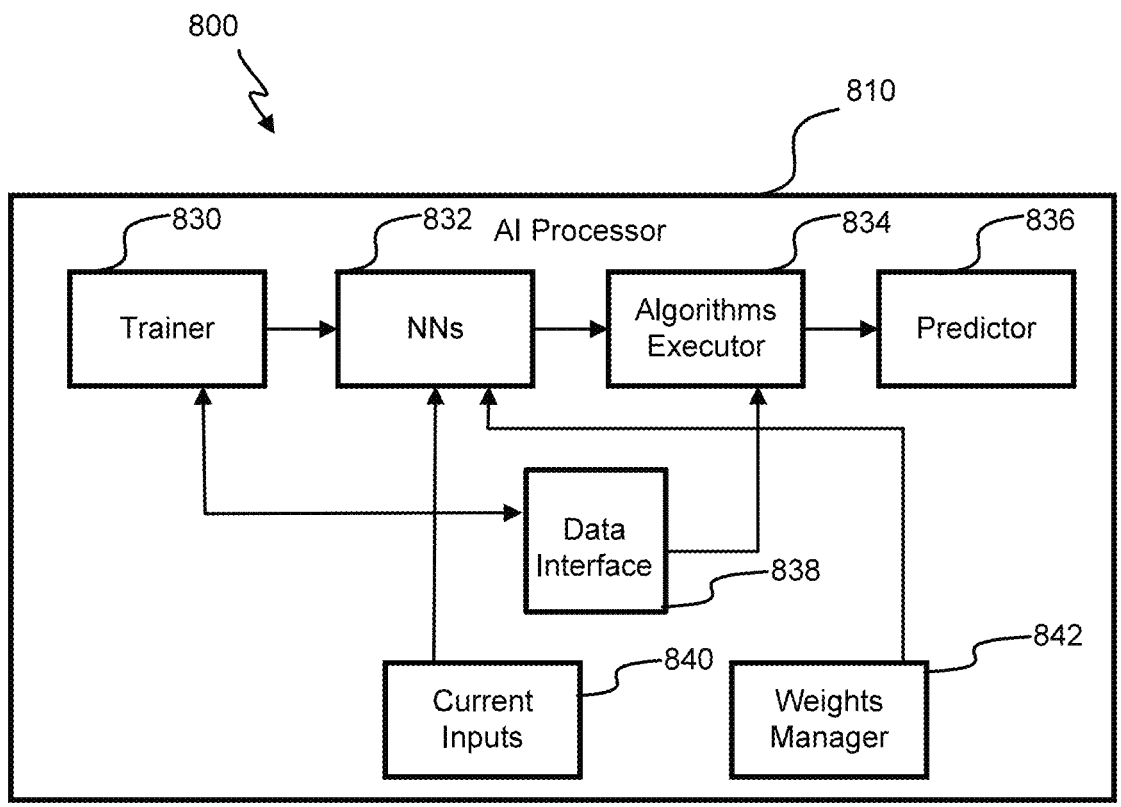
FIG. 8 illustrates a block diagram of predictor model for resource management system, according to an embodiment of the present disclosure.

Referring to FIG. 8, illustrates a block diagram of predictor model for resource management system. As described in further detail herein, a system 800 is a prediction model for a resource management system. The Entity and/or network node predictor module 810 includes various components, including a trainer module 830, NNs 832, algorithm executor 834, predictor module 836, data interface 838, input module 840, and weight manager 842.

In one exemplary embodiment, the trainer module 830 is responsible for training the neural network (NNs) 832 using a set of training data. The NNs 832 are a type of machine learning algorithm that can learn to make predictions based on patterns in the data. The algorithm executor 834 executes the prediction algorithm on the input data to generate predictions.

In one another exemplary embodiment, the predictor module 836 receives the prediction results from the algorithm executor 834 and provides them to the resource management system. The data interface 838 is responsible for communicating with external systems to receive input data and provide prediction results. The input module 840 provides input to the NNs 832 for making predictions. The weight manager 842 adjusts the weights of the neural network to improve the accuracy of the predictions.

As yet another example, the system could also include additional modules for pre-processing the input data or post-processing the prediction results for providing additional and improved accuracy of resource predictions, which could lead to more efficient resource allocation and cost savings.

As described in further detail herein, FIG. 8 illustrates the AI processor 810 which is a key component of a system that performs machine learning operations. The AI processor 810 comprises several elements, including a trainer 830, neural networks (NNs) 832, algorithms executor 834, predictor 836, data interface 838, current inputs 840, and weights manager 842.

In one exemplary embodiment, the trainer 830 receives data from the training data 836 via the data interface 838. Moreover, the trainer is responsible for training the neural networks 832 based on the data received from the data interface. The trainer uses various machine learning techniques to train the neural networks to recognize patterns in the data.

In one another exemplary embodiment, the algorithms executor 834 identifies the type of neural network (CNN, RNN, FC) and nature of current inputs 840. It then determines which algorithm to apply on the neural network, receives data from the algorithms data 824 via the data interface 838, and executes the identified algorithm on the neural network.

In one another exemplary embodiment, the weights manager 842 is responsible for managing the weights of the neural network based on instructions from the algorithms executor and trainer. The weights are updated during the training process to improve the accuracy of the neural network.

Furthermore, the predictor 836 is responsible for predicting the output of the neural network based on the input data received from the data interface. The predictor can be used for a variety of applications, such as image recognition, speech recognition, natural language processing, and more.

In one another exemplary embodiment, the AI processor 810 could include the addition of more algorithms or machine learning models. For example, a deep learning model could be added to the neural network for improved accuracy of the AI processor for certain applications. Additionally, the data interface could be expanded to support different types of data, such as audio or video.

In one another exemplary embodiment, the AI processor 810 performs machine learning operations and is responsible for training neural networks, identifying the appropriate algorithm to use, and predicting the output based on input data. In addition, the AI processor can be used for a variety of applications, such as image recognition, speech recognition, natural language processing, and more.

Figure 9:
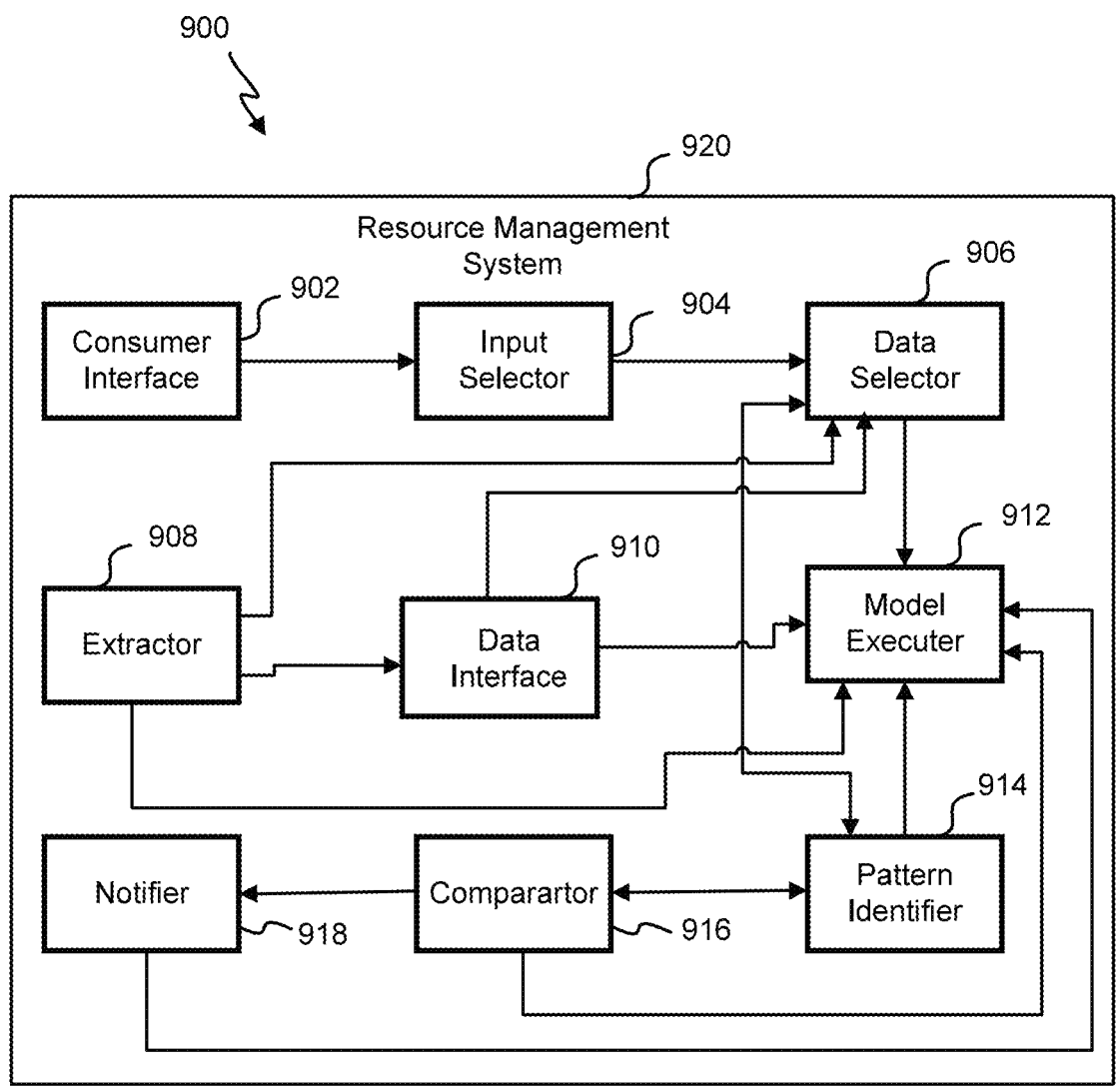
FIG. 9 illustrates a block diagram of pattern identifier model for resource management system according to an embodiment of the present disclosure.

Referring to FIG. 9, illustrates a block diagram of pattern identifier model for resource management system. As described in further detail herein, 900 represents a resource management system that uses pattern identification. In addition, the system 900 includes a resource management component 920, which includes a consumer interface 902, an input selector 904, a data selector 906, an extractor 908, a data interface 910, a model executor 912, a notifier module 918, a comparator 916, and a pattern identifier 914.

In one exemplary embodiment, the system 900 works by first receiving inputs from the consumer interface 902. The input selector 904 selects the inputs relevant to the resource management system and sends them to the data selector 906. The data selector 906 then selects data from the resource management system via the data interface 910. The extractor 908 extracts the relevant information from the data and sends it to the model executor 912, which uses the pattern identifier 914 to identify patterns in the data.

In one another exemplary embodiment, the comparator 916 then compares the identified patterns with previous patterns stored in the system to identify similarities and differences. Based on this comparison, the notifier module 918 generates recommendations for both Entities and network nodes in the resource management system.

Figure 10:
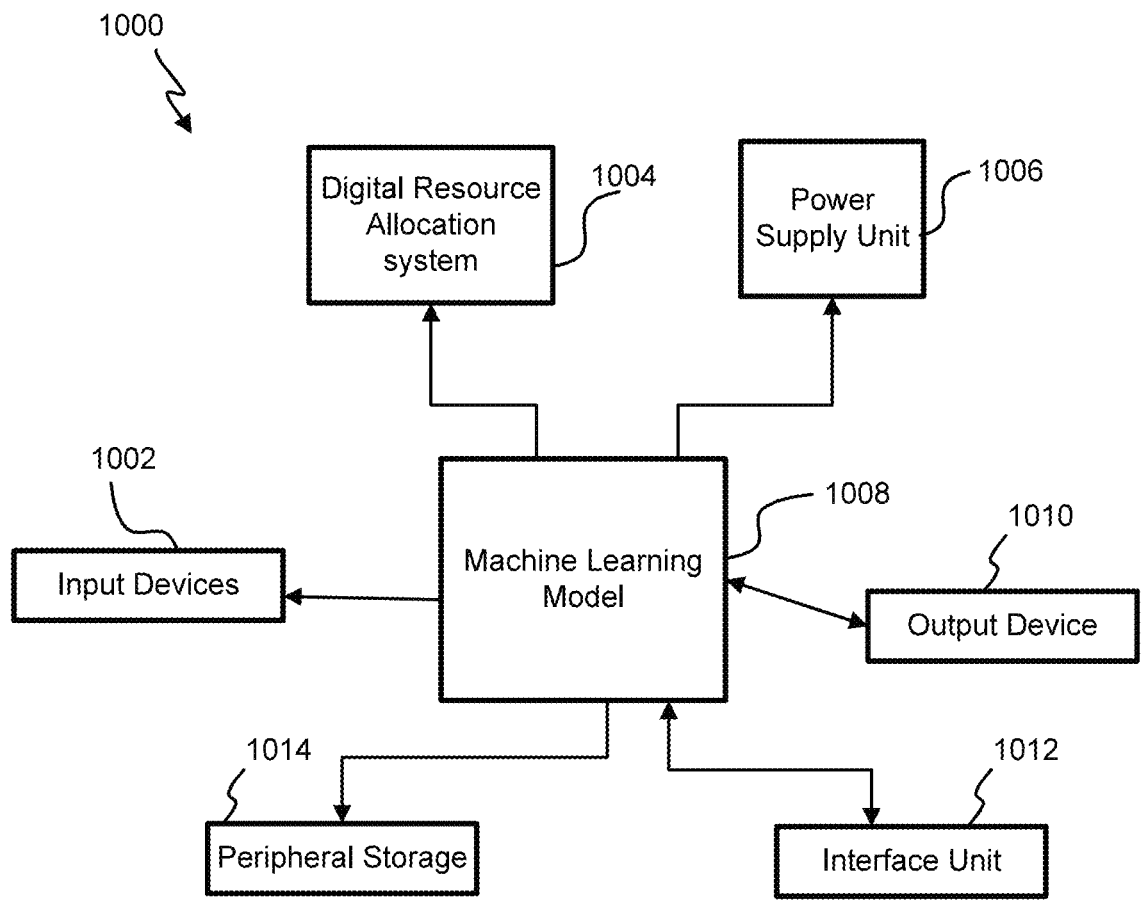
FIG. 10 illustrates a digital resource distribution strategy application running on an end-user device for resource management according to an embodiment of the present disclosure.

Referring to FIG. 10, illustrates a digital resource management application running on an end-user device for resource management. As described in further detail herein, FIG. 10 illustrates a machine learning system 1000 designed for a resource management system. The system 1000 comprises several input devices (Entities/network nodes) 1002, a digital resource management application 1004, a power supply unit 1006, a machine learning model 1008, an interface unit 1012, and a peripheral storage 1014. The output devices 1010 provide recommendations on UI and UX.

In one exemplary embodiment, the input devices 1002 are responsible for collecting data from Entities and network nodes, which is used to train the machine learning model 1008. The digital resource management application 1004 receives information from the machine learning model 1008 and utilizes this information to facilitate the resource management process. The power supply unit 1006 powers the system, while the interface unit 1012 provides a means for users to interact with the system.

In one another exemplary embodiment, the machine learning model 1008 is the core of the system, which receives input from the input devices 1002 and provides input to the digital resource management application 1004. The model then receives recommendations from the output devices 1010 or interface unit 1012. The peripheral storage 1014 is used to store the data collected by the input devices 1002, which can be used to train the machine learning model 1008.

Further, the function of the input devices 1002 is to collect data from Entities and network nodes, which is then used to train the machine learning model 1008. The digital resource management application 1004 utilizes the information received from the machine learning model 1008 to facilitate the resource management process. The power supply unit 1006 powers the system, while the interface unit 1012 provides a means for users to interact with the system. The peripheral storage 1014 is used to store the data collected by the input devices 1002, which can be used to train the machine learning model 1008. The machine learning model 1008 provides recommendations to the digital resource management application 1004, which is used to optimize the resource management process.

Figure 11:
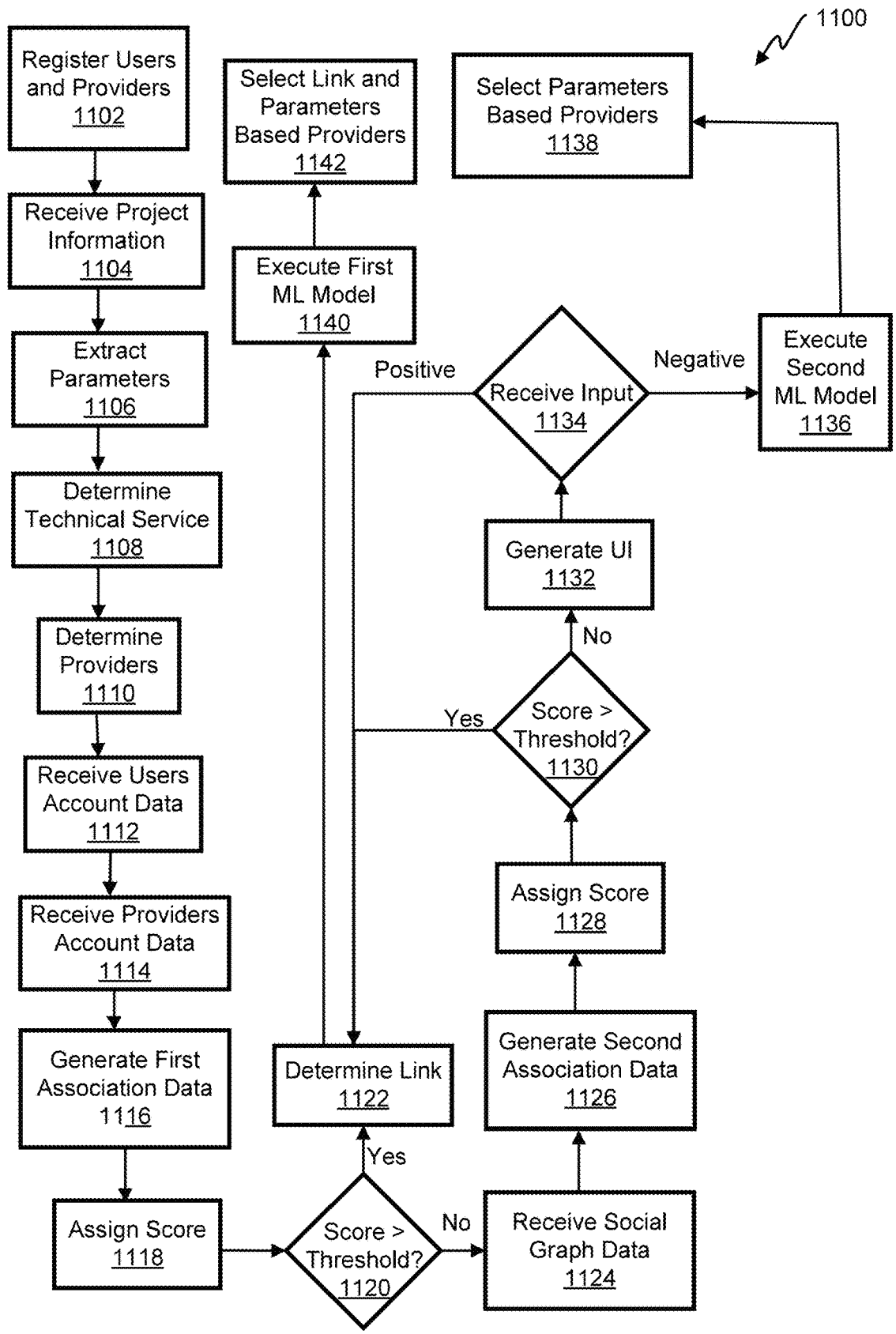
FIG. 11 illustrates a flowchart of a resource management system for generating association data between a user and a provider according to an embodiment of the present disclosure.

Referring to FIG. 11, illustrates a flowchart of a resource management system for generating association data between a user and a provider. As described in further detail herein, FIG. 11 illustrates a flowchart 1100 of a resource management system. The system 1100 is designed to manage the interaction between technology Entities (users) and technology Network nodes/providers. The system comprises several steps, starting with step 1102, where registration of both technology Entities and technology Network nodes/providers takes place. At step 1104, the system receives project information in the form of RFI or RFP, and at 1106, it extracts parameters from the received information.

In one exemplary embodiment, at 1108, the system determines the technical service required for the project based on the extracted parameters. At 1110, the system identifies the technology service Network nodes/providers based on the extracted parameters. Moreover, at 1112, the system receives user account data, and at 1114, it receives technology provider account data. In some instances, at 1116, the system generates first association data based on the extracted information, and then assigns a score at 1118.

In one another exemplary embodiment, at 1120, the system compares the score with a threshold value, and if the score is higher than the threshold value, the system determines a link between the Entity and network node at 1122, and then executes a first ML model at 1140, where the link and parameters based on Network nodes/providers are selected at 1142.

Furthermore, if the score is less than the threshold value, the system receives social graph data at 1124. At 1126, the system generates second association data based on the social graph data and assigns a second score at 1128. Additionally, at 1130, the system compares the second score with a second threshold value, and if the second score is higher than the second threshold value, the system determines a link between the Entity and network node at 1122. If the second score is less than the second threshold value, the system generates a UI at 1132.

In one another exemplary embodiment, at 1134, the system receives input and determines whether it is positive or negative. If the input is positive, the system determines a link between the Entity and network node at 1122. If the input is negative, the system executes a second ML model at 1136 and selects parameters based on Network nodes/providers generated by the ML model at 1138.

In one another exemplary embodiment, the flowchart 1100 illustrates a method for generating association data between a user and a provider based on the analysis of account data. The flowchart starts with step 1116, where the system generates the first association data between the user and the provider by analyzing their account data.

At step 1118, the system assigns a score to the amount of data available for analysis. If the score is less than a certain threshold, the system proceeds to step 1124 to gather data from social media platforms where the user and provider are registered.

Moreover, if the data is still insufficient in step 1130, the system generates an interface for the user to confirm the link between them and the provider. If the user confirms the link in step 1132, the system proceeds to step 1140 and executes the first machine learning algorithm based on the link information. However, if the user denies the link in step 1132, the system proceeds to step 1136 and executes the second machine learning algorithm to recommend Network nodes/providers for the user's project.

Figure 12:
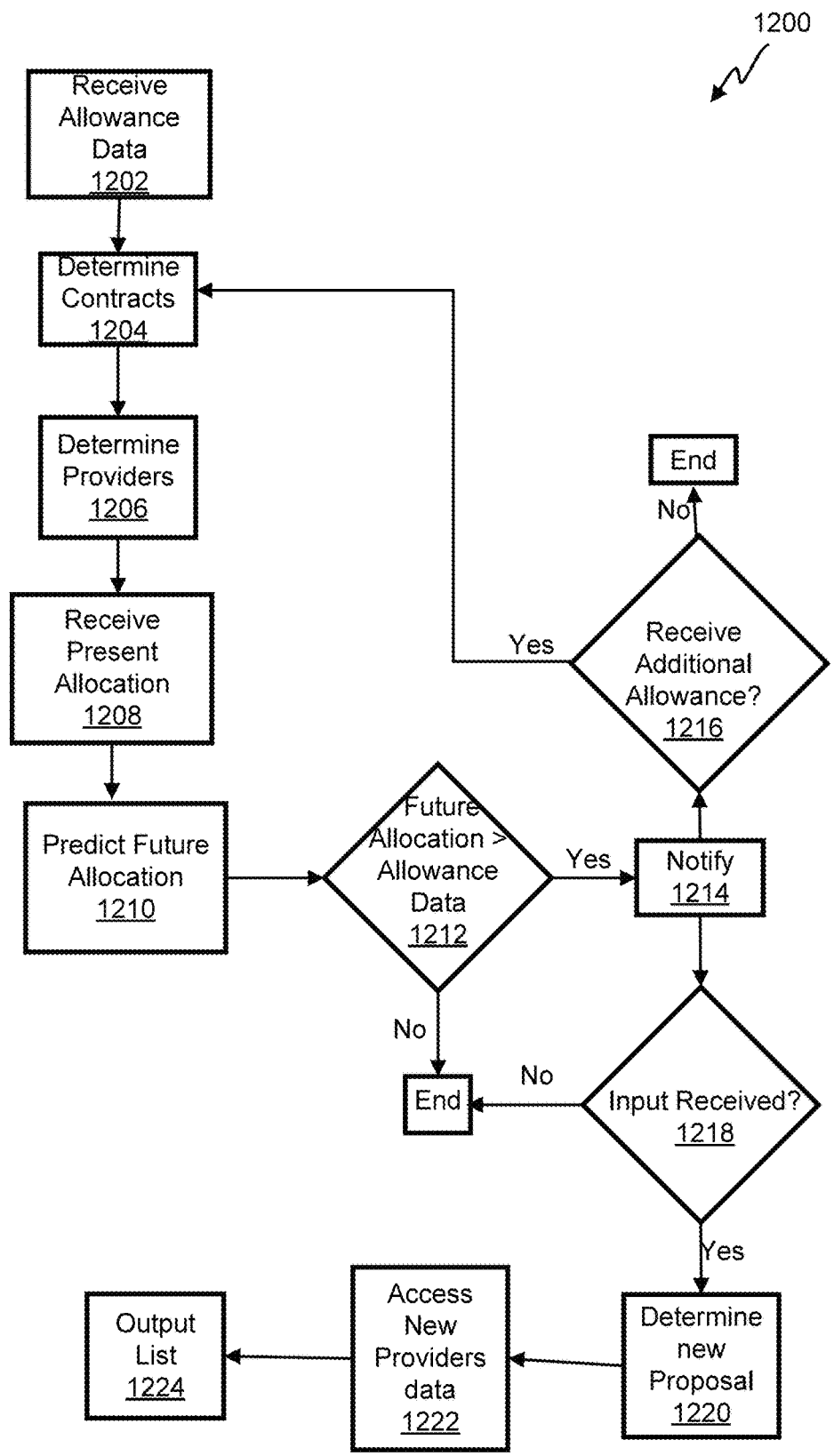
FIG. 12 illustrates a flowchart of a resource management system for orchestrating the project allocation of ongoing digital records with providers according to an embodiment of the present disclosure.

Referring to FIG. 12, illustrates a flowchart of a resource management system for managing the project allocation of ongoing digital records with Network nodes/providers. FIG. 12 describes a flowchart for a resource management system, which includes a series of steps for receiving allowance data, determining digital records and Network nodes/providers, predicting future allocations, comparing future allocation with allowance data, and determining new proposals. In addition, the system 1200 includes an input module 1202, a digital records and Network nodes/providers module 1204, a present allocation module 1208, a prediction module using an ML model 1210, and an output module 1224.

In one exemplary embodiment, the input module 1202 receives allowance data, which is used by the digital records and Network nodes/providers module 1204 to determine the digital records and Network nodes/providers for the system. The present allocation module 1208 receives the current allocation of the system. The prediction module 1210 uses an ML model to predict future allocations based on various parameters.

In one another exemplary embodiment, the system then compares whether future allocations are greater than allowance data at step 1212. If yes, the system notifies and proceeds towards 1216 to determine whether additional allowance has been received. In case of yes, the system proceeds from 1216 to 1204 to determine new digital records and Network nodes/providers. In case of no, the process is terminated.

Furthermore, if there is no input at step 1218, the process is terminated. In case of input received, the system triggers step 1220 to determine new proposals and accesses new Network nodes/providers data at step 1222, and outputs an updated list at step 1224.

In one another embodiment, the flowchart 1200 is designed to manage the project allocation of ongoing digital records with Network nodes/providers. At 1202, the system receives the project allocation from the user. At 1204, the system determines the ongoing digital records with Network nodes/providers. At 1206, the system determines the Network nodes/providers with which the digital records has been finalized. At 1210, the system receives the present resource allocation, including how much digital transaction has been made and new RFPs for which the digital records has to be signed.

Moreover, based on the present resource allocation and compliance data of Network nodes/providers, digital records milestones, etc., the system predicts the future allocation at 1210. If the predicted future allocation surpasses the project allocation, the system will issue a warning at 1214. At 1216, the system will present an interface to ask if the project allocation can be increased. If the project allocation cannot be increased, at 1218, the system will present an interface to receive input for recommending how to avoid project allocation overrun.

At 1220, the system will determine new RFPs for which the digital records has to be signed and recommend Network nodes/providers that are under the project allocation. The system will provide the user with a list of recommended Network nodes/providers and the amount of project allocation that will be allocated to each provider. The user can then select the provider based on their preference.

In yet another example, this system could include the ability to prioritize Network nodes/providers based on their performance in the past, the ability to adjust the project allocation allocation based on real-time changes in the ongoing projects, and the ability to automate the project allocation allocation process using machine learning algorithms.

Figure 13:
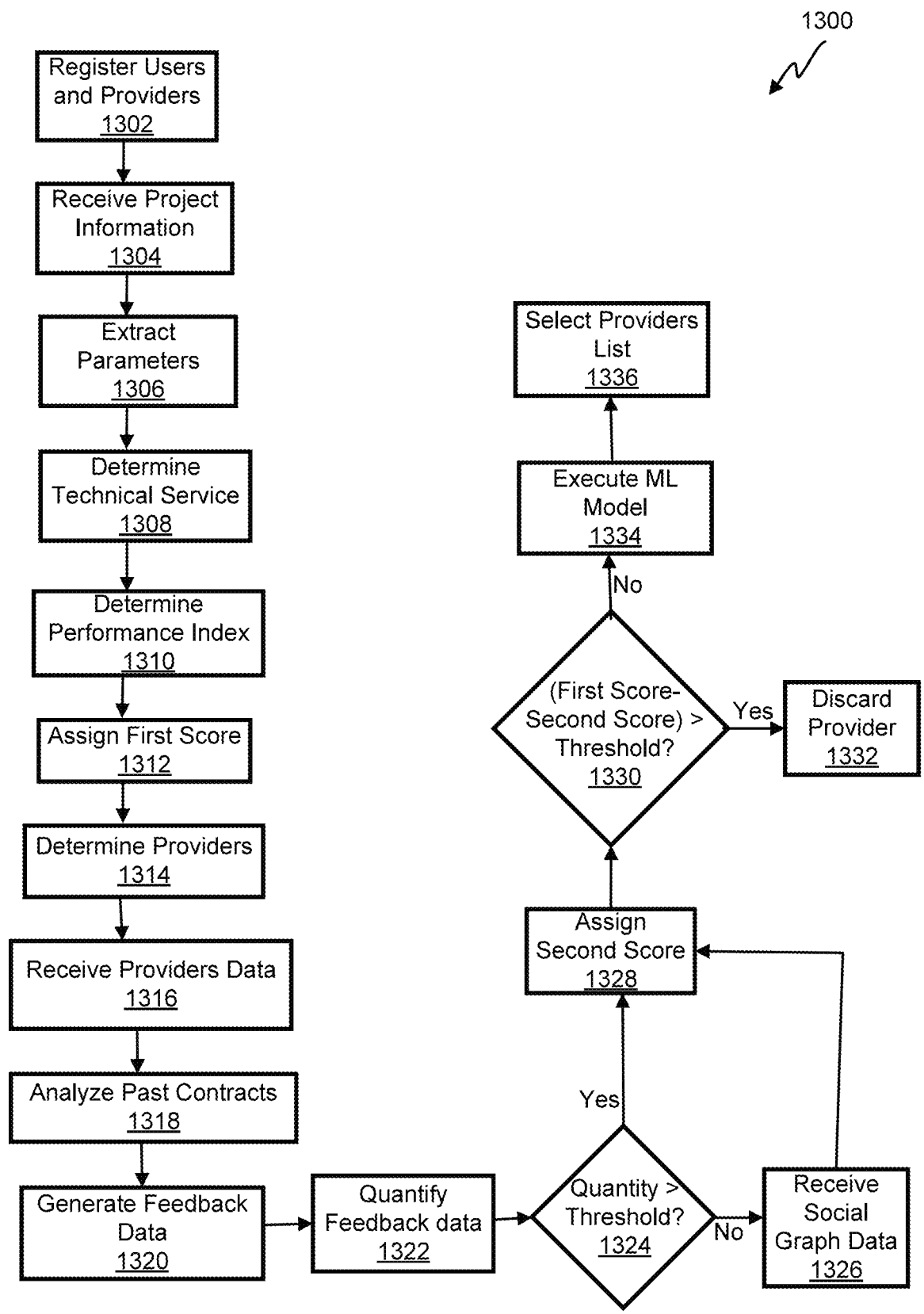
FIG. 13 illustrates a flowchart of a resource management system for determining and recommending technical service providers according to an embodiment of the present disclosure.

Referring to FIG. 13, illustrates a flowchart of a resource management system for determining and recommending technical service Network nodes/providers. As described in further detail herein, FIG. 13 illustrates a flowchart for a resource management system that helps in selecting the most appropriate Network nodes/providers for a project based on various parameters. The system begins at 1302 by registering both users and Network nodes/providers. Then, at 1304, the system receives project information in the form of a request for information or proposal. The system then proceeds to 1306 to extract relevant parameters from the received information, which are used to determine the technical services required by the project at 1308.

Next, at 1310, the system determines the performance index based on the parameters extracted in step 1306. At 1312, a first score is assigned to the project, which determines the relevance of the provider's past digital records and their performance. Based on this score, the system determines Network nodes/providers for the project at 1314, and receives Network nodes/providers data at 1316. The system then proceeds to 1318, where it analyzes past digital records to generate feedback data. This feedback data is then evaluated for quality at 1322, and compared to a threshold value at 1324.

Moreover, if the quality feedback data is less than the threshold value, the system jumps to 1326. If the quality feedback data is greater than the threshold value, the system assigns a second score at 1328. The system then compares the difference between the first and second scores to a second threshold value at 1330. If the compared value is greater than the second threshold value, the system jumps to 1332. If the compared value is less than the second threshold value, the system executes a machine learning model at 1334.

In one exemplary embodiment, the machine learning model helps to refine the selection of Network nodes/providers based on their past performance, and generates a list of Network nodes/providers at 1336. This list is then used to determine the final set of Network nodes/providers for the project.

In one another exemplary embodiment, the flowchart 1300 illustrates determination and recommendation of technical service Network nodes/providers based on their performance index (PI). At 1310, the system will determine the performance index of the required technical services based on the parameters mentioned in the RFPs. The performance index will be scored at 1312, for example, on a scale of 1 to 10.

At 1318, the system will analyze historical data and profile information of the Network nodes/providers to collect feedback data of the provider. If the amount of feedback data is not sufficient to determine the performance index for the provider at 1324, the system will retrieve social media information from various social media platforms on which the provider is registered at 1326. The score will be assigned to the performance index for each of the Network nodes/providers.

If the score of the performance index (PI) for the provider is near to the required PI for the project, then the system will recommend a list of Network nodes/providers based on the ML model.

Figure 14:
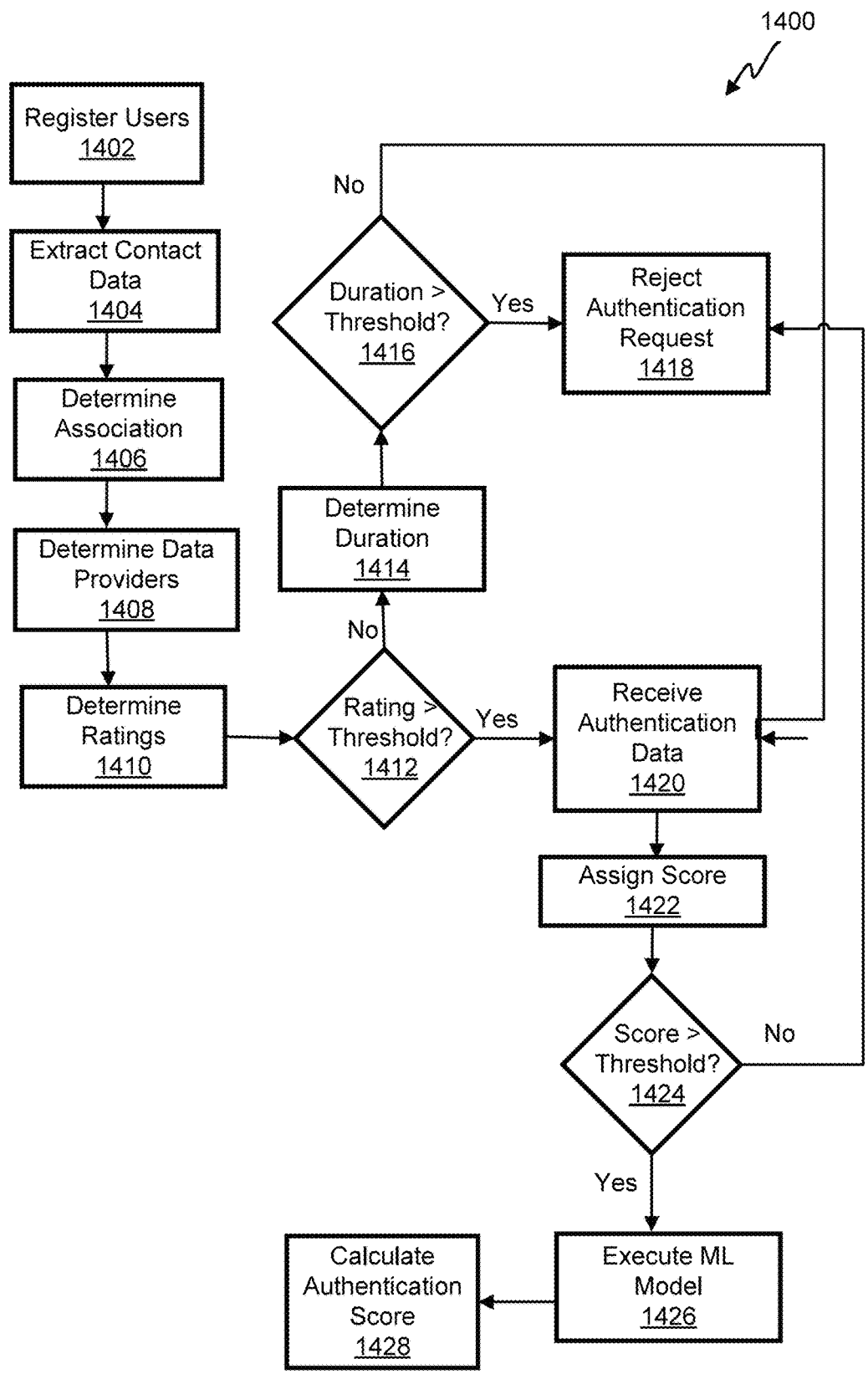
FIG. 14 illustrates a flowchart of a resource management system for extracting contact data and social media information according to an embodiment of the present disclosure.

Referring to FIG. 14, illustrates a flowchart of a resource management system for extracting contact data and social media information. FIG. 14 describes a flowchart for a resource management system that allows users to register and authenticate their contact data to participate in resource management. The flowchart includes several elements and interconnections that are explained below.

At 1402, users register on the platform. The system then extracts their contact data at 1404, which includes information such as name, email, and phone number. At 1406, the system determines the association of the user with the platform, which can be a Entity or a network node.

At 1408, the system determines the data Network nodes/providers that will be used to authenticate the user's contact data. At 1410, the system determines the user's ratings, which are based on their past performance on the platform. The ratings are then compared with a first threshold value at 1412. If the rating is less than the threshold value, the authentication request is rejected at 1414. Otherwise, the process proceeds to 1420 to determine the duration of the user's association with the platform.

If the duration is higher than a second threshold value, the authentication request is rejected at 1418. If the duration is less than the second threshold value, the system receives the user's authentication data at 1420. The system then assigns a score at 1422 based on the authenticity of the user's contact data.

The score is then compared with a third threshold value at 1424. If the score is less than the threshold value, the authentication request is rejected at 1418. If the score is higher than the threshold value, the system executes an ML model at 1426 to calculate the user's authentication score at 1428.

In one another exemplary embodiment, the flowchart 1400 describes a system for registering a user and extracting contact data and social media information. The system begins by registering the user at 1402 and extracting relevant contact data such as the user's name, email address, and educational information at 1404. The system then determines all of the social media platforms on which the user is registered at 1406.

At 1410, the system determines the ratings of each social media platform to assess their reliability and trustworthiness. If the rating of a social media platform falls below a certain threshold at 1412, the system will determine the duration of the user's registration and their level of activeness on that platform at 1414 to determine its relevance.

In one another exemplary embodiment, to gather more information about the user's social media presence, the system receives authentication data from third-party data Network nodes/providers associated with each social media platform at 1420. This data includes information on the number of spam messages the user has received, the number of connections they have, and the degree of activeness on the platform.

Figure 15:
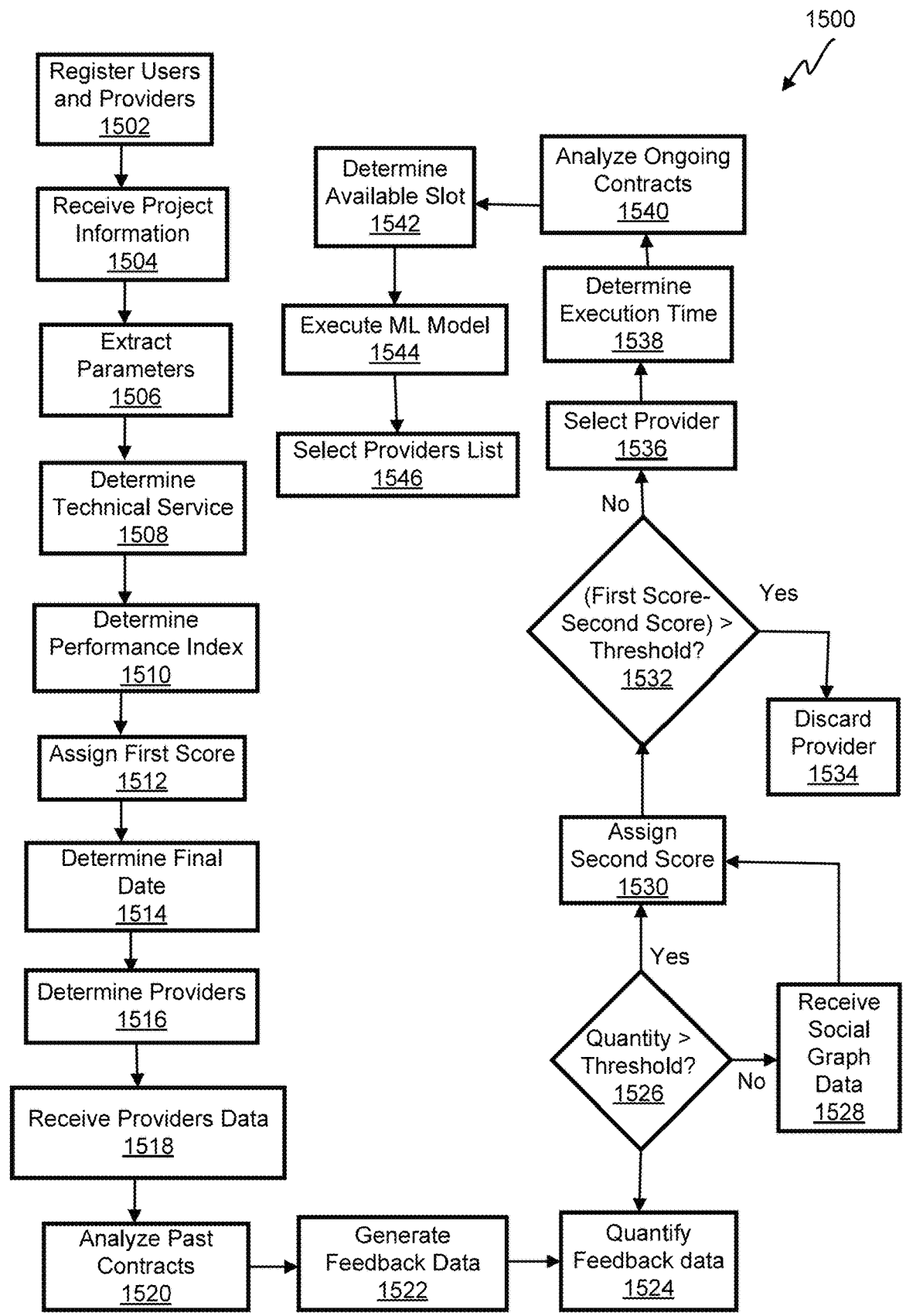
FIG. 15 illustrates a flowchart of a resource management system for analyzing past and ongoing digital records according to an embodiment of the present disclosure.

Referring to FIG. 15, illustrates a flowchart of a resource management system for analyzing past and ongoing digital records. Flowchart 1500 illustrates a resource management system that aims to streamline the process of selecting service Network nodes/providers for a project based on various parameters and feedback data.

At 1502, users and Network nodes/providers can register to the system. Once registered, at 1504, project information is received and at 1506, relevant parameters are extracted from the information. At 1508, the system determines the required technical service based on the extracted parameters. At 1510, the performance index is determined to assess the quality of the service provided. At 1512, the first score is assigned based on the performance index.

At 1514, the final data is determined based on the performance index and technical service. At 1516, potential Network nodes/providers for the project are determined. At 1518, the system receives data from the Network nodes/providers, which is then analyzed to determine past digital records at 1520 and generate feedback data at 1522. At 1524, the feedback data is quantified to facilitate comparison with a threshold value at 1526.

In case the quantified value is less than the threshold value, the system receives social graph data at 1528. If the quantified value is greater than the threshold value, the system proceeds to assign a second score at 1530. At 1532, the difference between the first score and the second score is compared with a second threshold value. If the difference is higher than the second threshold value, the system selects the provider at 1536.

At 1538, the system determines the execution time of the project, while ongoing digital records are analyzed at 1540 to determine the available slots. At 1544, the system executes a ML model to refine its provider selection, based on which the provider list is selected at 1546, and recommendations are generated.

In one another exemplary embodiment, the flowchart 1500 includes various steps for determining the deadline of the project, analyzing past digital records of Network nodes/providers, and analyzing ongoing digital records to determine slot availability.

At 1514, the system first determines the deadline of the project from the parameters of the project. This deadline is important as it will help the system to recommend Network nodes/providers who can complete the project within the given time frame.

Next, at 1520, the system will analyze the past digital records of the Network nodes/providers to determine their performance index in terms of service quality and execution time. This information will be used to recommend Network nodes/providers who have a good track record of completing projects within the given deadlines and providing high-quality services.

At 1538, the system will score the performance index of the Network nodes/providers on a scale of 1 to 10 based on the analysis of their past digital records. This score will help the system to recommend Network nodes/providers who have a higher performance index.

At 1540, the system will analyze the ongoing digital records of the Network nodes/providers to determine the slot availability for the current service. This analysis will help the system to recommend Network nodes/providers who have enough time and resources available to take on the new project.

Figure 16:
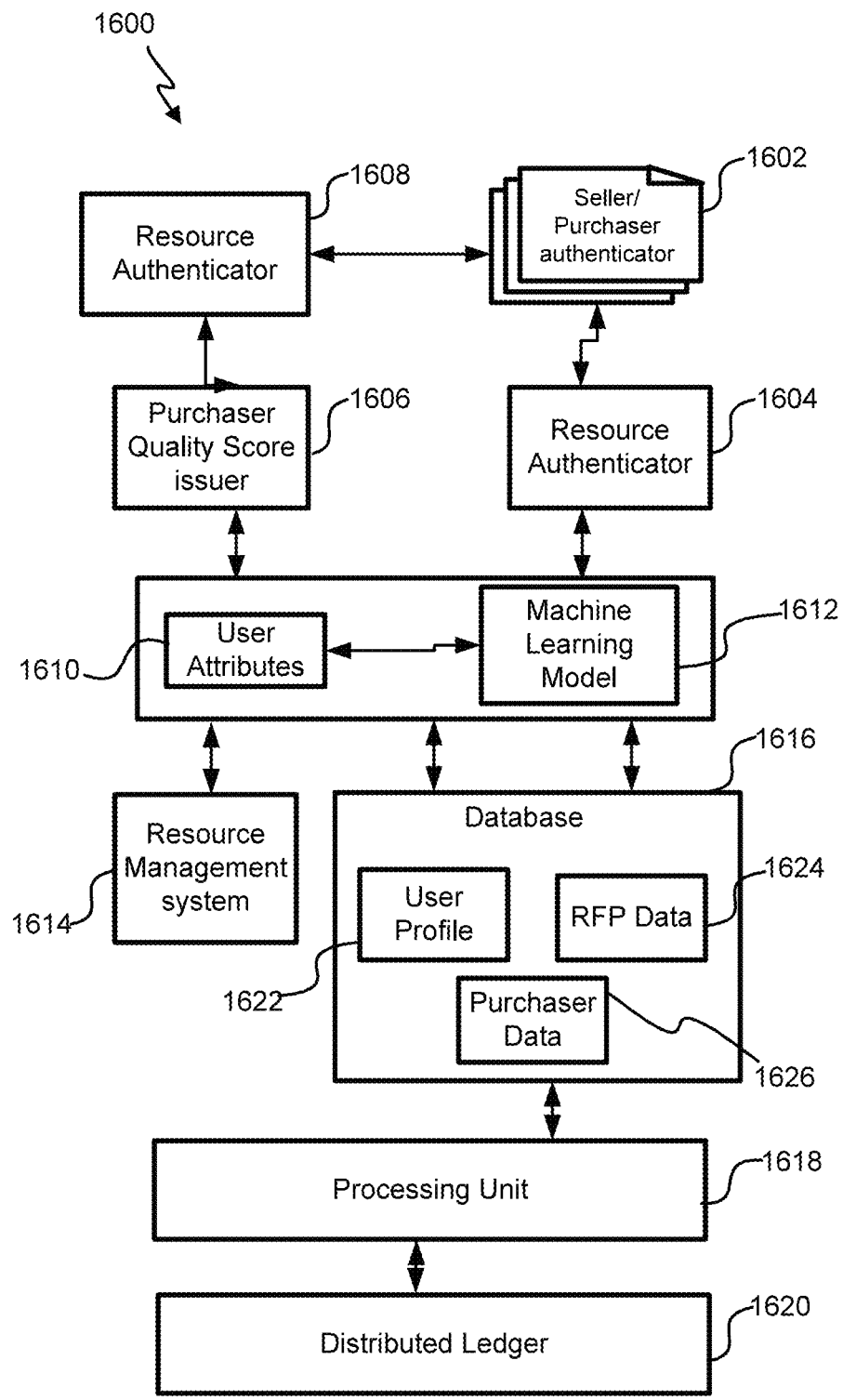
FIG. 16 illustrates an example embodiment of the resource management system according to another embodiment of the present disclosure.

Referring to FIG. 16, illustrates an example embodiment of the resource management system. In one exemplary embodiment, the general overview 1600 shows the different components of the system, which include a network node and/or purchaser authenticator 1602, resource authenticator 1604, purchase quality score issuer 1606, and resource management authenticator 1608. These components are interconnected serially with each other and coupled with a module having user (both network node/purchaser) attributes 1610 and machine learning model 1612, wherein the user attributes 1610 are coupled with the machine learning model 1612 internally.

The network node and/or purchaser authenticator 1602 is responsible for authenticating the user's identity and verifying their personal information. The resource authenticator 1604 verifies the digital transaction details and ensures that the digital transaction is processed correctly. The purchase quality score issuer 1606 assigns a unique index value to each user during the resource management process, which is used for qualified Network node selection. The resource management authenticator 1608 authenticates the network node and/or purchaser identities and ensures that the network node and/or purchaser are authorized to participate in the resource management event.

The module including user attributes 1610 and ML model 1612 is responsible for managing the user attributes and controlling the resource management process. The user attributes include personal information, such as name, address, contact details, and other relevant information, which are used for authentication and verification purposes. The ML model 1612 manages the resource management profiles, RFO, RFP information, including adding or removing members, updating resource management information, and other related tasks.

The module including user attributes 1610 and ML model 1612 is also coupled with a resource management system 1614 and a database 1616. The resource management system 1614 enables users to participate in the resource management programs online. The database 1616 stores user profiles 1622, RFP data 1624, and purchaser data 1626 for further authentication and verification purposes. The Database 1616 is also connected to a processing unit 1618 and a distributed ledger 1620.

The processing unit 1618 performs various processing tasks, including data processing, authentication, and verification. The distributed ledger 1620 records all the transactions and changes made to the system, which ensures transparency and security.

When a Entity or network node selects an option on the user interface, the resource management system processes the selected information using a machine learning model. The system generates recommendations for Entities and network nodes based on the processed information, which can help them make informed decisions during the resource management process.

In one exemplary embodiment, the integration of the resource coordination engine within the metaverse represents a significant advancement in digital resource management. In this virtual realm, the Resource Coordination Engine operates by interfacing with digital avatars that represent both Resource Requestor Nodes and Resource Supplier Nodes. This immersive environment allows for real-time interactions and data exchanges, making the process of resource allocation more intuitive and engaging. Users can visualize resource requests, proposals, and allocations in a three-dimensional space, enhancing their understanding and decision-making capabilities.

Further, one of the key benefits of the metaverse embodiment is the ability to leverage real-time data inputs from virtual interactions. The avatars within this digital landscape can communicate, negotiate, and finalize resource allocations dynamically, providing a level of immediacy and responsiveness that is unparalleled in traditional systems.

In particular, this real-time data is then fed into Predictive Computation Models, which analyze and forecast outcomes with greater accuracy due to the enriched dataset derived from these virtual interactions. The metaverse embodiment thus transforms the static, often delayed processes of resource coordination into a fluid, interactive, and highly efficient system.

Furthermore, the metaverse provides a platform for enhanced collaboration and transparency. Stakeholders from various nodes can convene in a shared virtual space to discuss and review resource allocations, ensuring that all parties have a clear understanding of the criteria and decisions being made. This collaborative approach not only fosters trust and cooperation but also reduces the likelihood of disputes and misunderstandings. By situating the Resource Coordination Engine within the metaverse, organizations can achieve a higher level of operational efficiency, agility, and stakeholder satisfaction, ultimately driving better outcomes in resource management. Multiple embodiments of the resource management system are possible, each with varying scope and technical advantages. For example, the system can be integrated with various types of user devices, such as desktop computers, laptops, tablets, and mobile phones. The user interface can also be customized to meet the specific needs of Entities and network nodes, and can include additional options such as project allocation, timeline, and project scope.

In one another exemplary embodiment, the resource management system provides a streamlined and efficient way for Entities and network nodes to participate in the resource management process. The system's user-friendly interface and machine learning capabilities help Entities and network nodes make informed decisions quickly and easily, which can result in faster transactions and increased customer satisfaction. Additionally, the system's customizable options and integration with various user devices make it a versatile and scalable solution for businesses of all sizes.

In addition, the system continuously updates the resource management algorithm based on feedback from Entities/network nodes, availability of resources, technologies, and other factors.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMS, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A computer-implemented method for resource allocation using artificial intelligence, the method comprising:
   receiving input information related to one or more queries from a plurality of sources, wherein the one or more queries are received via query initiators;
   ingesting and processing the input information, including query parameters, relational data, performance metrics, and past records to generate structured data;

analyzing the structured data using one or more machine learning models to generate predictions about which entities are likely to qualify for projects;

generating a list of qualified entities based on the predictions;

transmitting the list of qualified entities and recommendations for resource distribution to a query initiator;

managing ongoing transactions with service entities based on present resource distribution, adherence information, and transaction benchmarks to predict prospective distribution, recommend cost-efficient service entities, and distribute resources based on the recommendations;

receiving compliance data of the service entities and determining digital record event markers for ongoing transactions, wherein the digital record event markers enables determination of future resource allocation needs;

predicting future resource allocation needs based on the present resource distribution and the digital record event markers;

comparing the predicted future resource allocation with a predefined project allocation threshold;

issuing a warning based on a determination that the predicted future resource allocation surpasses the predefined project allocation threshold, wherein the determination is based on comparison of the predicted future resource allocation with the predefined project allocation threshold;

based on the determination that the predicted future resource allocation surpasses the predefined project allocation threshold, presenting an interface to the query initiators to receive input for adjusting resource distribution strategy, wherein the interface includes visual analytics dashboards for monitoring resource allocation and project progress;

analyzing feedback data from the service entities, wherein a first score is assigned to a project, which determines relevance of past digital records and performance of the service entities;

quantifying the feedback data to facilitate comparison with a threshold value;

analyzing social graph data to determine if a quantified value is less than the threshold value; and assigning a second score to select a service entity for the project if the quantified value is greater than the threshold value and a difference between the first score and the second score is higher than a second threshold value.

2. The method of claim 1, wherein the query parameters include data about project requirements, timelines, and project allocation constraints.

3. The method of claim 1, further comprising training machine learning algorithms based on historical performance data and feedback from previous projects.

4. The method of claim 1, wherein the Structured data includes categorized performance metrics specific to different types of the projects and the entities.

5. The method of claim 1, further comprising generating a compliance score for each service entity based on adherence information and the feedback data.

6. The method of claim 1, wherein the predictions generated by machine learning algorithms are continuously updated based on real-time data inputs.

7. The method of claim 1, wherein the recommendations for the resource distribution include prioritized allocation strategies based on cost-efficiency and project criticality.

8. The method of claim 1, further comprising using natural language processing (NLP) techniques to interpret and categorize the query parameters from unstructured data sources.

9. A system for optimizing resource allocation using machine-learning predictive algorithms, the system comprising:

one or more processors; and a memory storing instructions that, when executed by the one or more processors, cause the one or more processors to:

receive input information related to one or more queries from a plurality of sources, wherein the one or more queries are received via query initiators;

ingest and process the input information, including query parameters, relational data, performance metrics, and past records to generate Structured data;

apply one or more predictive algorithms to the Structured data to generate predictions about which entities are likely to qualify for projects;

generate a list of qualified entities based on the predictions;

transmit the list of qualified entities and recommendations for resource distribution to a query initiator;

manage ongoing transactions with service entities based on present resource distribution, adherence information, and transaction benchmarks to predict prospective distribution, recommend cost-efficient service entities, and distribute resources based on the recommendations;

receive compliance data of the service entities and determine digital record event markers for ongoing transactions, wherein the digital record event markers enable determination of future resource allocation needs;

predict future resource allocation needs based on the present resource distribution and the digital record event markers;

compare the predicted future resource allocation with a predefined project allocation threshold;

issue a warning based on a determination that the predicted future resource allocation surpasses the predefined project allocation threshold, wherein the determination is based on comparison of the predicted future resource allocation with the predefined project allocation threshold;

based on the determination that the predicted future resource allocation surpasses the predefined project allocation threshold, present an interface to the query initiators to receive input for adjusting resource distribution strategy, wherein the interface includes visual analytics dashboards for monitoring resource allocation and project progress;

analyze feedback data from the service entities, wherein a first score is assigned to a project, which determines relevance of past digital records and performance of the service entities;

quantify the feedback data to facilitate comparison with a threshold value;

analyze third party data to determine if a quantified value is less than the threshold value; and assign a second score to select a service entity for the project if the quantified value is greater than the threshold value and a difference between the first score and the second score is higher than a second threshold value.

10. The system of claim 9, wherein the query parameters include data about project requirements, timelines, and project allocation constraints.

11. The system of claim 9, wherein the memory further stores instructions that, when executed by the one or more processors, cause the one or more processors to train the predictive algorithms based on historical performance data and feedback from previous projects, wherein the predictive algorithms are machine-learning algorithms.

12. The system of claim 9, wherein the Structured data includes categorized performance metrics specific to different types of the projects and the entities.

13. The system of claim 9, wherein the memory further stores instructions that, when executed by the one or more processors, cause the one or more processors to generate a compliance score for each service entity based on adherence information and the feedback data.

14. The system of claim 9, wherein the predictions generated by the predictive algorithms are continuously updated based on real-time data inputs.

15. The system of claim 9, wherein the recommendations for the resource distribution include prioritized allocation strategies based on cost-efficiency and project criticality.

16. The system of claim 9, wherein the memory further stores instructions that, when executed by the one or more processors, cause the one or more processors to use natural language processing (NLP) techniques to interpret and categorize the query parameters from unstructured data sources.

17. A computer-program product tangibly embodied in a non-transitory machine-readable storage medium, including instructions configured to cause a processing apparatus to perform operations for optimizing resource allocation using machine-learning predictive algorithms, including:

receiving input information related to one or more queries from a plurality of sources, wherein the one or more queries are received via query initiators;

ingesting and processing the input information, including query parameters, relational data, performance metrics, and past records to generate structured data;

applying one or more predictive algorithms to the Structured data to generate predictions about which entities are likely to qualify for projects;

generating a list of qualified entities based on the predictions;

transmitting the list of qualified entities and recommendations for resource distribution to a query initiator;

managing ongoing transactions with service entities based on present resource distribution, adherence information, and transaction benchmarks to predict prospective distribution, recommend cost-efficient service entities, and distribute resources based on the recommendations;

receiving compliance data of the service entities and determining digital record event markers for ongoing transactions, wherein the digital record event markers enables determination of future resource allocation needs;

predicting future resource allocation needs based on the present resource distribution and the digital record event markers;

comparing the predicted future resource allocation with a predefined project allocation threshold;

issuing a warning based on a determination that the predicted future resource allocation surpasses the predefined project allocation threshold, wherein the determination is based on comparison of the predicted future resource allocation with the predefined project allocation threshold;

based on the determination that the predicted future resource allocation surpasses the predefined project allocation threshold, presenting an interface to the query initiators to receive input for adjusting resource distribution strategy, wherein the interface includes visual analytics dashboards for monitoring resource allocation and project progress;

analyzing feedback data from the service entities, wherein a first score is assigned to a project, which determines relevance of past digital records and performance of the service entities;

quantifying the feedback data to facilitate comparison with a threshold value;

analyzing third party data to determine if a quantified value is less than the threshold value; and assigning a second score to select a service entity for the project if the quantified value is greater than the threshold value and a difference between the first score and the second score is higher than a second threshold value.

18. The computer-program product of claim 17, further comprising training the predictive algorithms based on historical performance data and feedback from previous projects, wherein the predictive algorithms are machine-learning algorithms.

19. The computer-program product of claim 17, further comprising generating a compliance score for each service entity based on adherence information and the feedback data.

20. The computer-program product of claim 17, further comprising using natural language processing (NLP) techniques to interpret and categorize the query parameters from unstructured data sources.

* * * * *